US011776033B2

(12) United States Patent
Ariel et al.

(10) Patent No.: US 11,776,033 B2
(45) Date of Patent: Oct. 3, 2023

(54) ELECTRONIC PLATFORM, SYSTEMS, AND METHODS FOR PLANNING POLISHED DIAMOND PARAMETERS TO ENABLE INDIVIDUAL DIAMOND TRANSACTIONS

(71) Applicant: Clara Diamond Solutions Limited Partnership, Vancouver (CA)

(72) Inventors: Aaron Ariel, Vancouver (CA); Ophir E. Stolov, Vancouver (CA)

(73) Assignee: Clara Diamond Solutions Limited Partnership, Vancouver (CA)

(*) Notice: Subject to any disclaimer, the term of this patent is extended or adjusted under 35 U.S.C. 154(b) by 0 days.

(21) Appl. No.: 15/975,692

(22) Filed: May 9, 2018

(65) Prior Publication Data
US 2018/0260869 A1     Sep. 13, 2018

Related U.S. Application Data

(63) Continuation-in-part of application No. 15/808,793, filed on Nov. 9, 2017.
(Continued)

(30) Foreign Application Priority Data

May 16, 2017  (EP) .................................... 17171390

(51) Int. Cl.
*G06Q 30/06*     (2023.01)
*G06Q 10/08*     (2023.01)
(Continued)

(52) U.S. Cl.
CPC ....... *G06Q 30/0619* (2013.01); *G06Q 10/087* (2013.01); *G06Q 30/0641* (2013.01)

(58) Field of Classification Search
CPC ...... G06Q 40/04; G06Q 10/087; G06Q 30/08; G06Q 30/0619; G06Q 30/0641
(Continued)

(56) References Cited

U.S. PATENT DOCUMENTS 5,950,178 A    9/1999  Borgato
7,693,751 B2   4/2010  Aronson
(Continued)

FOREIGN PATENT DOCUMENTS

CA    2325130 A1    5/2002
IL     250326       1/2022
(Continued)

OTHER PUBLICATIONS

Nash, K.; "IBM Pushes Blockchain into the Supply Chain"; The Wall Street Journal; Jul. 14, 2016; https://www.wsj.com/articles/ibm-pushes-blockchain-into-the-supply-chain-1468528824.
(Continued)

*Primary Examiner* — Paul Danneman
(74) *Attorney, Agent, or Firm* — SNELL & WILMER L.L.P.

(57) ABSTRACT

An electronic computer-implemented and interactive platform is described, which permits the offer, sale, and distribution of diamonds by sellers to purchasers and, as a result, into the overall diamond marketplace. Each diamond is scanned in order to create a three-dimensional (3D) virtual model that can include images and/or other data that digitally identifies that diamond, providing a "fingerprint" of the diamond. The purchaser may have highly confidential and proprietary information that specifies the critical details of its manufacturing process for each type of cut of polished diamond, referred to as polished diamond parameters (PDPs). A planning system is used to offload time consuming and computationally expensive planning operations from the manufacturer (or other purchaser), and does so prior to a purchase. The planning system and a matching process are used by the platform to enable the data in each PDP file to be applied to the 3D virtual model of each individual diamond.

23 Claims, 17 Drawing Sheets

Related U.S. Application Data

(60) Provisional application No. 62/420,958, filed on Nov. 11, 2016.

(51) Int. Cl.
*G06Q 30/0601* (2023.01)
*G06Q 10/087* (2023.01)

(58) Field of Classification Search
USPC .......................................................... 705/28
See application file for complete search history.

(56) References Cited

U.S. PATENT DOCUMENTS

| | | | |
|---|---|---|---|
| 2009/0070236 A1* | 3/2009 | Cohen | G06Q 40/04 705/37 |
| 2009/0083099 A1 | 3/2009 | Fetanat | |
| 2009/0125435 A1* | 5/2009 | Cohen | G06Q 30/06 705/37 |
| 2010/0250201 A1* | 9/2010 | Sivovolenko | G01N 21/87 703/1 |
| 2012/0101830 A1 | 4/2012 | Dholakiya | |
| 2013/0226765 A1* | 8/2013 | Tai | G06Q 40/04 705/37 |
| 2014/0279337 A1 | 9/2014 | Rapaport | |
| 2015/0356555 A1* | 12/2015 | Pennanen | G06Q 20/06 705/71 |
| 2016/0103938 A1* | 4/2016 | Ariel | G06F 17/5009 703/6 |
| 2018/0137569 A1* | 5/2018 | Ariel | G06Q 10/087 |
| 2018/0260869 A1* | 9/2018 | Ariel | G06Q 30/0619 |

FOREIGN PATENT DOCUMENTS

| | | |
|---|---|---|
| JP | 2001063805 A | 3/2001 |
| RU | 2012148747 | 5/2014 |
| WO | 2008045613 | 4/2008 |
| WO | 2009068354 A1 | 6/2009 |
| WO | 2011127870 | 10/2011 |

OTHER PUBLICATIONS

Riaz, Z.; International Search Report from corresponding PCT Application No. PCT/CA2018/050558; search completed Aug. 3, 2018.
De Smet, M.; Search Report from related European Application No. 17171390.2; search completed Jul. 3, 2017.
Federal Institute of Industrial Property, Russian Search Report dated Mar. 15, 2021 in Application No. 2017139080.
Search report dated Nov. 30, 2021 in corresponding Russian Application No. 2019141277 filed May 9, 2018; total 4 pages.
Volpicelli, Gian M., "How the blockchain is helping stop the spread of conflict diamonds," Wired, Feb. 15, 2017; https://www.wired.co.uk/article/blockchain-conflict-diamonds-everledger; pp. 1-2.
Ntellectual Property India, India Office Action dated Feb. 15, 2022 in Application No. 201927046866.
China National Intellectual Property Administration, First Chinese Office Action dated Mar. 29, 2023 in Application No. 201880045211.3.
China National Intellectual Property Administration, Chinese Search Report dated dated Mar. 27, 2023 in Application No. 201880045211.3.
Federal Service On Industrial Property, Israeli Office Action of substantive Examination dated Feb. 6, 2023 in Application No. 2019141277.

* cited by examiner

New Order # 372D93t

1. Select Shape

100

2. Select Tolerances

ELECTRONIC PLATFORM, SYSTEMS, AND METHODS FOR PLANNING POLISHED DIAMOND PARAMETERS TO ENABLE INDIVIDUAL DIAMOND TRANSACTIONS

CROSS-REFERENCE TO RELATED APPLICATION(S)

This application claims the benefit of priority to EP Application No. 17171390.2 filed on May 16, 2017, and is a continuation-in-part of U.S. patent application Ser. No. 15/808,793 filed on Nov. 9, 2017, which claims priority to U.S. Provisional Application No. 62/420,958 filed on Nov. 11, 2016; the contents of all applications being incorporated herein by reference.

TECHNICAL FIELD

The following relates to an electronic platform, systems, and methods for planning polished diamond parameters to enable individual diamond transactions, in particular for planning and matching rough diamonds with desired polished diamond orders.

BACKGROUND

Commodities such as gold, silver, and platinum are considered to be homogeneous in nature, and therefore they can typically have a market price determined at any time depending on the global market. However, such a price for an individual diamond, particularly a rough diamond, is difficult to determine because its value is based on its intrinsic factors such as size, model, color, and diamond inclusion type and location. There are infinite combinations based on these factors which cause every rough diamond to be unique. Additionally, purchasers have unique manufacturing specifications and polished sales distributions. This results in variance among prices for individual rough diamonds. For instance, two purchasers can give the same rough diamond a completely different price. Thus, in order to determine a universally accepted price and reduce price variance for a resource that is heterogeneous in nature, an assortment process is created in the diamond industry to facilitate diamond transactions.

In the assortment process, sellers of rough diamonds, and purchasers have contractual agreements that require each party to supply and purchase a certain number of rough diamonds, respectively. The transaction occurs at a sales event that is hosted once every five weeks, ten times a year. The agreement requires the purchaser to buy an allotment of rough diamonds (an "allocation") at every sales event. An allocation consists of one or more assortments of rough diamonds (an "assortment") that a purchaser can buy at every sales event.

An assortment is a grouping of rough diamonds that are similar in weight, shape or model, color, and clarity. Each allocation is specific to the purchaser and every purchaser's allocation can be made up of various assortments. For example, in an assortment of Crystals 4-8 Grainers that is made up of rough diamonds that range from 0.90-2.49 carats in weight, those diamonds may have a model, color, clarity, and weight with the following specificities: Octahedron Models (two pyramids back to back); Color range of D-K; Clarity Range of VVS-SI; Sizes/Weights as follows: i) Four Grainers (4GR) (0.90-1.19 carats); ii) Five to Six Grainers (5-6GR) (1.2-1.79 carats); and iii) Eight Grainers (8GR) (1.80-2.49 carats).

Overall, each seller takes its inventory of rough diamonds and sorts the rough diamonds into assortments. The diamonds in the assortment are grouped to meet certain parameters such as the one provided above. The parameters for each grouping correspond to the rough diamond requirements by category or subcategory that is common to purchasers. While each assortment is generally consistent at each sales event, there is slight variation in composition. Each rough diamond within an assortment can be assigned a different price per seller based on its own qualities of weight, shape or model, color, and clarity. An average price is calculated based on the individual rough diamonds within that assortment. Each seller has a variation on assortments that are similar but different.

This approach, however, is not found to optimize value for either the seller or the purchaser. The sellers utilize the assortment process to sell a broad spectrum of rough diamonds within each assortment so each purchaser receives both optimal and suboptimal products for its unique manufacturing purposes. Thus, while each purchaser buys particular assortments for their polished diamond needs, there are often products that the purchaser cannot use and that must be resold on the secondary market, sold unprofitably as polished diamonds, or held in inventory. The purchasers have to absorb the loss because the purchasers need to rely on the diamonds supplied by the sellers to fulfill their polished diamond demand. The sellers use this method to sell both less desirable products with desirable products to ensure their whole production is sold. Moreover, adding different assortments to a supply can make this adverse effect worse.

This approach has not been updated or modified over the last several generations commensurate with the advancement in technology. The sellers and purchasers are required to meet frequently and be physically present at each sales event to conduct the transaction. In addition, purchasers are not required to physically inspect each assortment before agreeing to purchase the rough diamonds. There is an option to physically inspect each assortment, but this requires traveling to a high security facility in locations such as Botswana or Belgium to inspect individual diamonds under security cameras or other restrictions. Based on the physical inspection (involving a visual examination by a human), purchasers may reject an assortment based on the inspection but the rejection can have significant impact such as with respect to the ability to potentially meet current or future demands. The secondary market of rough diamonds also suffers from the same defects. Accordingly, there remains a need for a system and method that are improved over the current diamond transaction process.

SUMMARY

In one aspect, there is provided a method of planning polished diamond parameters to enable individual diamond transactions, the method comprising: providing an electronic platform comprising a first interface for sellers of individual diamonds, and a second interface for purchasers of individual diamonds; receiving, via the first interface, data generated from a scan of an individual diamond, the data comprising a virtual model that digitally identifies that individual diamond; generating a record of that individual diamond and associating at least one unique identifier with the record; receiving, via the second interface, a plurality of orders from one or more purchasers, the orders each comprising at least one set of polished diamond parameters, an order price, and an order quantity; accessing a planning system to apply the parameters in each of the plurality of orders to the virtual model of the individual diamond and generate an output indicating if that individual diamond corresponds to a potential polished diamond or diamonds that can be produced according to one or more sets of polished diamond parameters, and if so, what the order price would be; using the output and the order quantities associated with the orders to match the individual diamond with one or more orders; and initiating a transaction process associated with the individual diamond.

In another aspect, there is provided a method of enabling individual diamond transactions, the method comprising: providing an electronic platform comprising an interface for purchasers of individual diamonds; receiving, via the interface, from each of a plurality of purchasers, at least one set of polished diamond parameters, each set of polished diamond parameters specifying a manner in which a rough diamond is to be manufactured to become a polished diamond; storing the plurality of sets of polished diamond parameters together as an aggregated collection of polished diamond parameters to enable orders for polished diamonds meeting one or more of the sets of polished diamond parameters to be matched with individual diamonds sold via the electronic platform.

In yet another aspect, there are provided computer readable media for performing the above methods.

In yet another aspect, there is provided a system for of planning polished diamond parameters to enable individual diamond transactions, the system comprising: an electronic platform comprising a first interface for sellers of individual diamonds, and a second interface for purchasers of individual diamonds; and memory storing computer executable instructions for: receiving, via the first interface, data generated from a scan of an individual diamond, the data comprising a virtual model that digitally identifies that individual diamond; generating a record of that individual diamond and associating at least one unique identifier with the record; receiving, via the second interface, a plurality of orders from one or more purchasers, the orders each comprising at least one set of polished diamond parameters, an order price, and an order quantity; accessing a planning system to apply the parameters in each of the plurality of orders to the virtual model of the individual diamond and generate an output indicating if that individual diamond corresponds to a potential polished diamond or diamonds that can be produced according to one or more sets of polished diamond parameters, and if so, what the order price would be; using the output and the order quantities associated with the orders to match the individual diamond with one or more orders; and initiating a transaction process associated with the individual diamond.

BRIEF DESCRIPTION OF THE DRAWINGS

Embodiments will now be described with reference to the appended drawings wherein:

FIG. 5B is a screen shot of a user interface for selecting shape parameters and for selecting tolerances for a new diamond order;

DETAILED DESCRIPTION

Figure 1A:
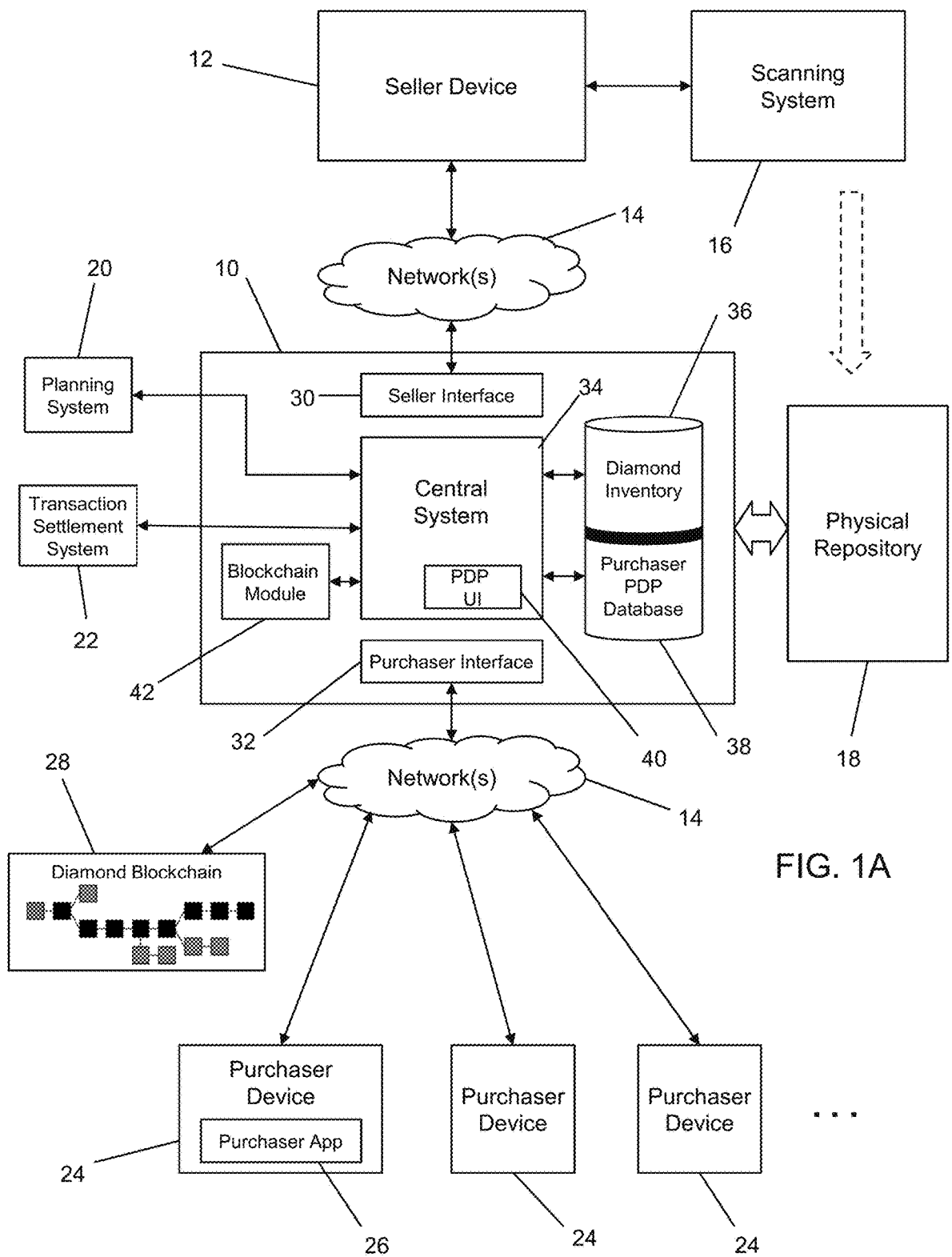
FIG. 1A is a block diagram of a computing environment in which a platform for planning polished diamond parameters (PDPs) to enable individual diamond transactions can operate, in one example configuration providing a central system accessible via one or more networks.

An electronic computer-implemented and interactive platform is herein described, which can include one or more computer-implemented electronic system(s) and/or services that can include specialized software applications, related data, and physical control over diamond distribution and transactions. The platform permits the offer, sale, and distribution of diamonds by sellers to purchasers and, as a result, into the overall diamond marketplace. Each diamond is scanned in order to create a three-dimensional (3D) virtual model that can include images and/or other data that digitally identifies that diamond, providing a "fingerprint" of the diamond.

A system can be implemented, using one or more computing devices, software, and databases, within and/or connected to the interactive platform, to create unique identifiers (UIDs) for each scanned diamond, and associate the virtual model with the UID. The platform can include or have access and/or control over one or more physical repositories to store each diamond with at least the UID to enable the virtual model and its data (i.e. the "fingerprint") to be verified with and against any physical diamond sample. The physical repositories can be located at or near the electronic platform, or in various geographic locations.

It is recognized herein that in addition to handling the scanning, storage, and thus "entry" of a diamond into an individual diamond transaction marketplace, the purchaser may have highly confidential and proprietary information that specifies the critical details of its manufacturing process for each type of cut of polished diamond, referred to hereinafter as polished diamond parameters (PDPs). For example, two purchasers can be manufacturers of similar shapes of polished diamonds but each purchaser produces a different polished diamond because of its proprietary manufacturing specifications. This information is also closely tied to each purchaser's polished diamond distribution. That is, the electronic platform provides a secure and isolated mechanism by which diamond supply can be provided, and orders placed and fulfilled, without requiring the opposing parties to interact, let alone share potentially sensitive information. Moreover, as explained in greater detail below, the platform utilizes a planning system to offload time consuming and computationally expensive planning operations from the manufacturer (or other purchaser), and does so prior to a purchase. In this way, manufacturers can optimize supply and manufacturing channels, as well as eliminate the need for expensive scanning systems and planning software.

The platform can include a secure data storage to store the proprietary manufacturing information of each purchaser, and maintain the confidentiality of that information throughout the operation of the electronic platform. Alternatively, a trusted third party system can be used to store this information on behalf of both the platform and the purchasers.

The planning system and matching process used by the platform enables the data in each PDP file to be applied to the 3D virtual model of each individual diamond. The planning software can process spatial and physical properties (e.g., interior imperfections) and as a result produces an output that communicates that the rough diamond corresponds to a potential polished diamond or diamonds that can be produced according to one or more of the PDPs. The planning operations are highly parallelizable, enabling the platform to scale its computational power according to both cost and throughput considerations. The platform can provide an interface through which a purchaser can specify a polished diamond order (i.e., an order for individual diamonds that can/will become specified polished diamonds, potentially as a batch). The order can specify a particular PDP of the purchaser, and can be entered through a user interface, for example a graphical user interface providing a number of screens that the user steps through to enter the parameters used to create the PDP, and to associate that PDP with a particular order. The order can specify ranges of parameters and an offer price for each individual polished diamond that is desired to be manufactured.

Each seller can specify an ask price for diamonds that meets certain characteristics and groupings of parameters. It can be appreciated that sellers can specify their asking prices as precisely as the seller want. For example, the platform can even enable a seller to have a different ask price for each rough diamond that they sell. The platform can process each individual diamond and when a match exists, and the bid price is at or above the ask price, execute a process for completing the sale of that rough diamond to the bidding purchaser. The bid price identifies a price that the purchaser is willing to pay for a polished diamond, yet to be created from a rough diamond (or semi-polished stone if appropriate). The platform effectively acts as an intermediary in translating between the bid and ask prices without requiring a manual allocation of these prices. Using the bid price, and the matching, an appropriate price for an individual rough stone can be ascertained, on behalf of the parties. In response to the transaction, information can be updated in an inventory database to represent that the rough diamond has been sold and related information can be updated. The platform can also be responsible for initiating a distribution process in which the diamonds are physically retrieved and moved through a distribution chain, which can include aggregating rough diamonds sold to the same purchaser and checking identifiers at points through the chain to confirm the secure transfer of each rough diamond to the facility of the purchaser.

It can be appreciated that the platform can be operated in an automated manner by having the processes described herein applied to individual diamonds without requiring that the sellers or purchasers inspect or confirm individual diamonds for purchase. Preferably, the platform maintains pending orders, the volume of pending orders, prices, and volume of transactions ("sales") confidential such that the information is not available or displayed to sellers and purchasers and is maintained confidential through its operation except for communicating the volume sold or purchased for a corresponding user and the price paid or received.

In the following description and examples provided herein, reference to rough diamonds may be made, as well as to diamonds more generally. It can be appreciated that while the principles and implementations described herein have particular advantages in enabling the transaction of individual rough diamonds, these principles and implementations can also be adapted for planning and transactional operations involving semi-polished, polished, and synthetic diamonds, as well as other gem stones.

Turning now to the figures, FIG. 1A provides one example of a configuration for the electronic platform 10 deployed and operating within a typical computing and communication environment. In this example, the platform 10 can be accessed and/or communicated with by a seller device 12 via one or more networks 14, such as any accessible wired and/or wireless networks 14 (referred to hereinafter as "the network 14" or "a network 14"). The seller device 12 represents any computing device or system that is capable of electronically accessing the network 14 and performing certain computational operations described herein. Examples of such devices 12 include smart phones, tablet computers, laptop computers, desktop computers, wearable devices, in-vehicle infotainment or navigation systems, gaming devices, augmented reality or virtual reality devices, other entertainment devices, and so on. While only a single seller device 12 is shown in FIG. 1A, it can be appreciated that several seller devices 12 can access the platform 10, and any such devices may be subjected to registration, sign-in or other verification measures to communicate with the platform 10.

In the example configuration shown in FIG. 1A, the seller device 12 is in communication with (or otherwise coupled to) a scanning system 16. The scanning system 16 is used to generate a 3D virtual model, including images and other data that identify and describe a particular diamond. For example, the scanning system 16 can include commercially available scanning apparatus and software traditionally used to scan rough diamonds obtained by producers or purchased by manufacturers of such rough diamonds. As illustrated using an arrow in dashed lines, after utilizing the scanning system 16, a seller can physically transport a scanned diamond to a physical repository 18. The physical repository 18 can be situated in various geographical locations, and controlled in various ways. In the example shown in FIG. 1A, the physical repository 18 is located at, within, or near the central system 10 to provide temporary storage of a diamond added to the platform 10, until that diamond is sold and delivered to a purchaser. It can be appreciated that both local and central physical repositories 18 can be used in various implementations. It can also be appreciated that the platform 10 can be configured without requiring a physical repository 18, namely wherein the sellers are responsible for shipping the diamond directly to the purchasers.

The platform 10 includes, has access to, or is in communication with a planning system 20, which is operable to execute a planning process using the data and images acquired by the scanning system 16, in order to plan diamonds with respect to PDPs of a purchaser. The planning system 20 can be hosted on a secure cloud-based server by the platform 10 or a third party planning entity. In the example shown in FIG. 1A, the platform 10 is in communication with an external planning system 20 that may be operated by a third party vendor or a related entity. The planning system 20 may require significant computational resources to complete the planning process, and may require scalability. As such, the planning system 20 can be implemented using scalable infrastructure, for example, using a number of graphical processing units (GPUs) known to provide enhanced processing capabilities for large or highly parallelized tasks. In this way, the planning system 20 can not only offload the computational burden of the planning process (discussed in greater detail below), but also be scaled as the inventory of diamonds, and the volume of transactions handled by the platform 10 increases over time.

The platform 10 includes, has access to, or is in communication with a transaction settlement system 22, preferably hosted and operated by a financial institution or payment processing entity. The transaction settlement system 22 provides an ability for the platform 10 to conveniently coordinate a transaction settlement process that includes a first transaction between a purchaser and the platform 10, and a second transaction between a seller and the platform 10, based on the results of a matching process described in greater detail below. For example, the platform 10 preferably maintains isolated transactions with purchasers and sellers to avoid the need to have these entities transact with each other directly.

The platform 10 can also be accessed and/or communicated with by a purchaser device 24 via one or more networks 14, such as any accessible wired and/or wireless networks 14 (referred to hereinafter as "the network 14" or "a network 14"). The network 14 accessed by the purchaser device(s) 24 can be the same or different than the network 14 accessed by the seller device 12 and any distinction between the two networks 14 is omitted herein for the sake of clarity. The purchaser device 24 represents any computing device or system that is capable of electronically accessing the network 14 and performing certain computational operations described herein. Examples of such devices 24 include smart phones, tablet computers, laptop computers, desktop computers, wearable devices, in-vehicle infotainment or navigation systems, gaming devices, augmented reality or virtual reality devices, other entertainment devices, and so on. As shown in FIG. 1A, the purchaser device 24 can include a browser or locally-installed application or "app", herein referred to as the "purchaser app 26". The purchaser devices 24 may be subjected to registration, sign-in or other verification measures to become a component or member of the platform 10.

Importantly, a purchaser can also be a seller from the perspective of the platform 10. For example, a purchaser of individual diamonds via the platform 10 may also buy assortments through traditional channels and have surplus rough diamonds that they wish to sell individually, since they do not fit within their PDP(s). In such a case, an entity that has been a purchaser through the platform 10 may then become a seller. As such, the seller device 12 and purchaser device 24 can be the same device in some circumstances. Moreover, the purchaser app 26 can be a portion or module of another application or portal that provides a user with the ability to sign-in and utilize the platform 10 as either a seller or a purchaser. Single sign on functionality can be provided, as well as other enhancements to enable a smooth transition between "seller" and "purchaser" functionality.

The platform 10 includes several components shown in FIG. 1A, which will be explained in greater detail below. The platform 10 can include a seller interface 30 comprising the software and/or hardware required to enable the seller devices 12 to connect into the platform 10, as well as enable the platform 10 to communicate with the seller devices 12. Similarly, the platform 10 can include a purchaser interface 32 comprising the software and/or hardware required to enable the purchaser devices 24 to connect into the platform 10, as well as enable the platform 10 to communicate with the purchaser devices 24. The platform 10 in this example configuration also includes a central system 34, which can be implemented as one or more servers or other computing devices hosting services, applications, databases and other computing elements that enable the platform 10 to operate as herein described. In this example, the central system 34 is operable to communicate with the external planning system 20 and transaction settlement system 22.

The central system 34 can also be configured to electronically communicate with the physical repository 18, e.g., for updating electronic inventory records according to physical stock added to the repository 18. The central system 34 is also responsible for maintaining confidentiality and security for data stored within the platform 10. For example, a diamond inventory 36 and a purchaser PDP database 38 can be stored within one or more data storage devices with appropriate logical separation between the data stored therein, in order to conceal the sellers' information from the purchasers' information, and vice versa. The diamond inventory 36 is used to store database entries, files, and/or other memory elements that are identifiable, accessible, and associated with particular sellers. For example, UIDs can be used to search and access associated images and other data for a diamond that has been added to the platform 10, which can include stages wherein a physical presence within the repository 18 apply, and/or wherein a physical transportation operation is underway. The purchaser PDP database 38 is used to securely add, edit, delete, store, and access PDPs created or uploaded to the platform 10 by a purchaser device 24, via the purchaser app 26. In this example, the central system 34 hosts or otherwise provides a PDP user interface (UI) 40 that facilitates the creation, uploading, editing, and deletion of a PDP by a purchaser. The PDP UI 40 can be subscription based and have certain login credentials, and have security measures applied in order to maintain a secure system for the purchasers. For example, a public key- or symmetric key-based cryptographic architecture can be utilized, with authentication and/or encryption applied to data stored and/or communications with the platform 10. It can be appreciated that the seller interface 30 and purchaser interface 32 can have the same or similar security and other infrastructure as the PDP UI 40, and these interfaces/UIs can be implemented using a common interface.

The platform 10 can also include a blockchain module 42 to allow the platform 10 to create records for, and add data to, a diamond blockchain 28. In the configuration shown in FIG. 1A, the blockchain module 42 is accessible to the central system 34 in order to enable the central system 34 to use the individual diamond planning and transaction processes as both a creation and an entry point for blockchain records for diamonds. For example, since rough diamonds sold individually using the platform 10 are entering the market for the first time, the platform 10 and diamond blockchain 28 can be used to capture and document those diamonds from their origin, and continue to add and link records overtime as the diamond is manufactured, sold, re-sold, etc. Further detail concerning the diamond blockchain 28 and the blockchain module 42 are provided later.

Figure 1B:
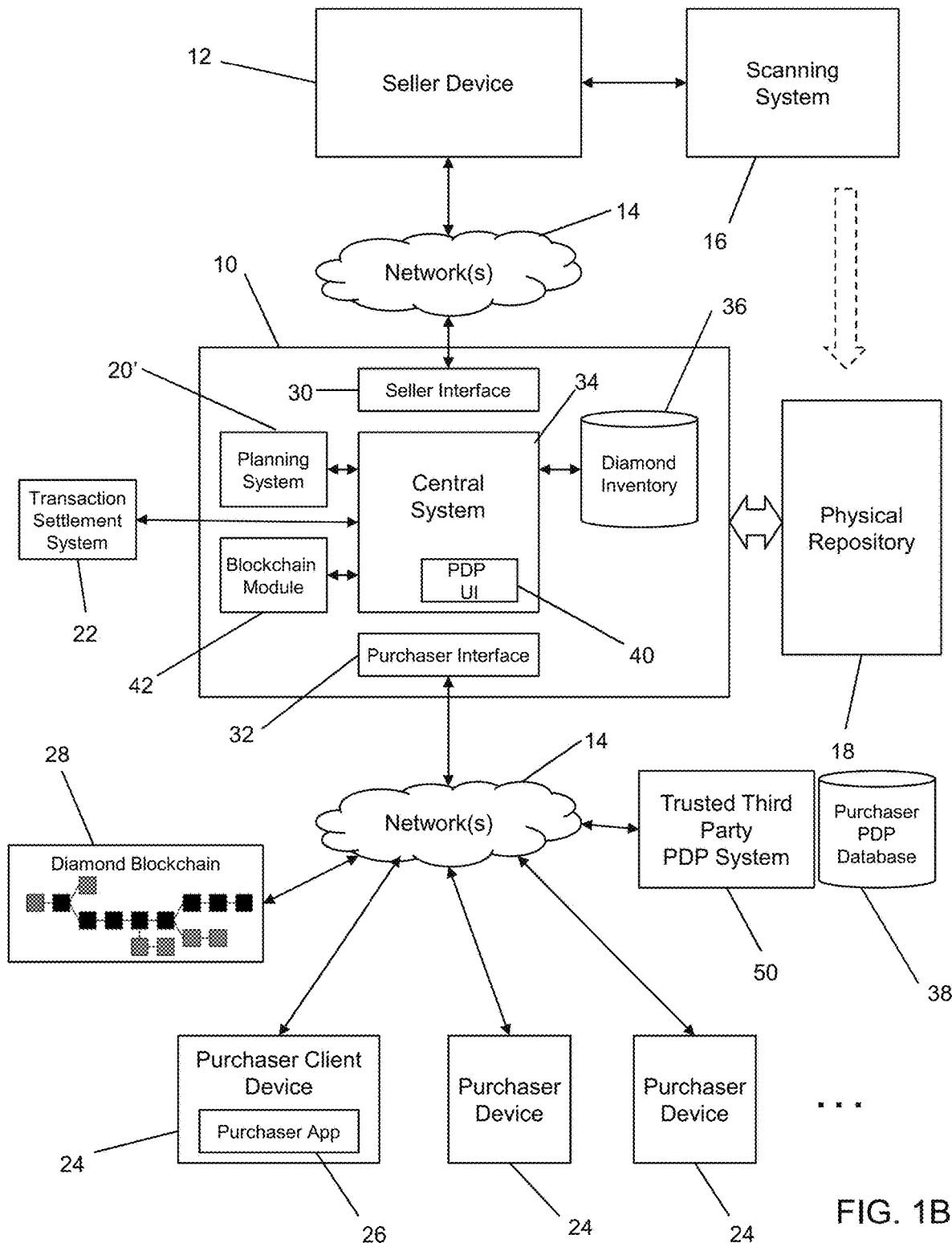
FIG. 1B is a block diagram of a computing environment in which a platform for planning polished diamond parameters to enable individual diamond transactions can operate, in one example configuration.

The particular configuration for the elements of, and/or accessible to, the platform 10 shown in FIG. 1A is only one illustrative example, and variations can be implemented to suit a particular deployment. Moreover, certain functionality can be migrated to other platforms, locations, and services over time as business and technological considerations change. For example, as computing resources become greater, certain functionality can be migrated to third party services. Turning now to FIG. 1B, a variation in the configuration shown in FIG. 1A is provided. In this variation, an internally deployed planning system 20' is hosted by the platform 10. That is, it can be appreciated that the planning system 20, 20' can be hosted externally, internally, or through a combination of internal and external components (not shown). For example, the planning system 20 can be external as shown in FIG. 1A as described above, or internal as shown in FIG. 1B. For an external system 20 as shown in FIG. 1A, an application programming interface (API) or other software components can be used to enable data and instructions to be passed from the central system 34 to the planning system 20. For an internal system 20' as shown in FIG. 1B, the central system 34 can include or otherwise be further integrated with the planning system 20'. A distributed configuration (not shown) can also be implemented with planning system instances provided on both external and internal devices. The exact configuration and distribution of computing resources can therefore vary to suit the particular application, available resources, and economic considerations.

FIG. 1B also illustrates another optional variation to the configuration shown in FIG. 1A, wherein the purchaser PDP database 38 is located remotely, such that at least some of the trust required in the platform 10 is minimized. In FIG. 1B, a trusted third party PDP system 50 is provided in secure communication with the platform 10 and planning system 20' via the network 14. The trusted third party PDP system 50 includes and accesses the purchaser PDP database 38 to securely manage the adding, editing, deleting, storing, and accessing of the PDPs created and/or provided to the platform 10 by the purchaser. Various access-control measures can be implemented for this purpose. For example, the platform 10 can provide a secure link or redirection to the trusted third party PDP system 50, to offload the handling of the PDPs themselves and to instill the inherent "trust" to the purchasers. When used in the planning and matching processes, the platform 10 and trusted third party PDP system 50 can establish secure communication channels to securely transport the PDPs for use in those processes. It can be appreciated that the planning system 20' and trusted third party PDP system 50 could also be implemented by a same third party.

Figure 1C:
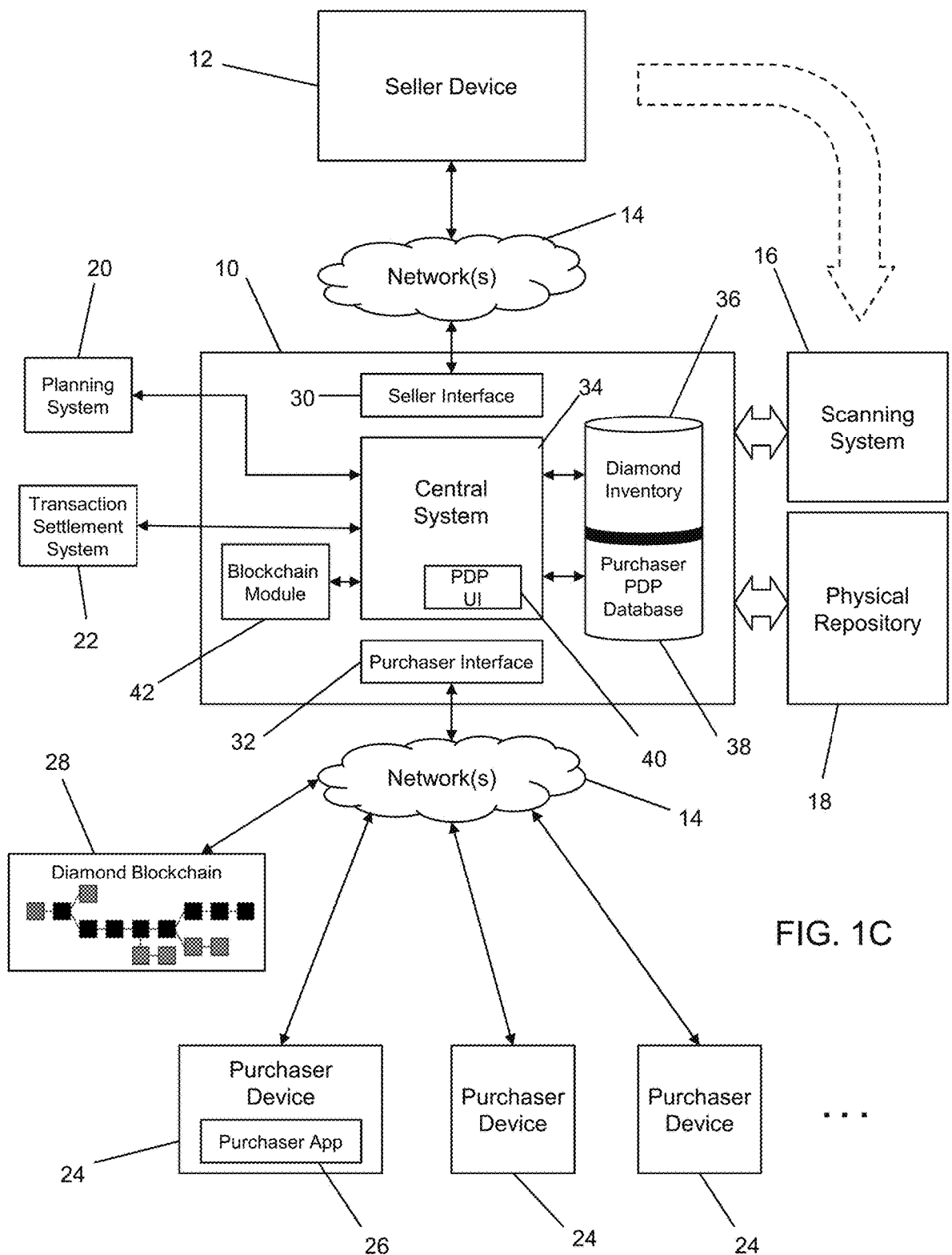
FIG. 1C is a block diagram of a computing environment in which a platform for planning polished diamond parameters to enable individual diamond transactions can operate, in one example configuration.

FIG. 1C illustrates another optional variation to the configurations shown in FIGS. 1A and 1B, wherein the scanning system 16 is used by the platform 10 to perform the scanning operations on behalf of the sellers. For example, as shown in FIG. 1C, the seller device 12 can be used to electronically establish new diamond inventory, while physically transporting the diamond to the platform 10 for scanning, physical storage, and subsequent transactions with the purchaser and the seller.

Figure 1D:
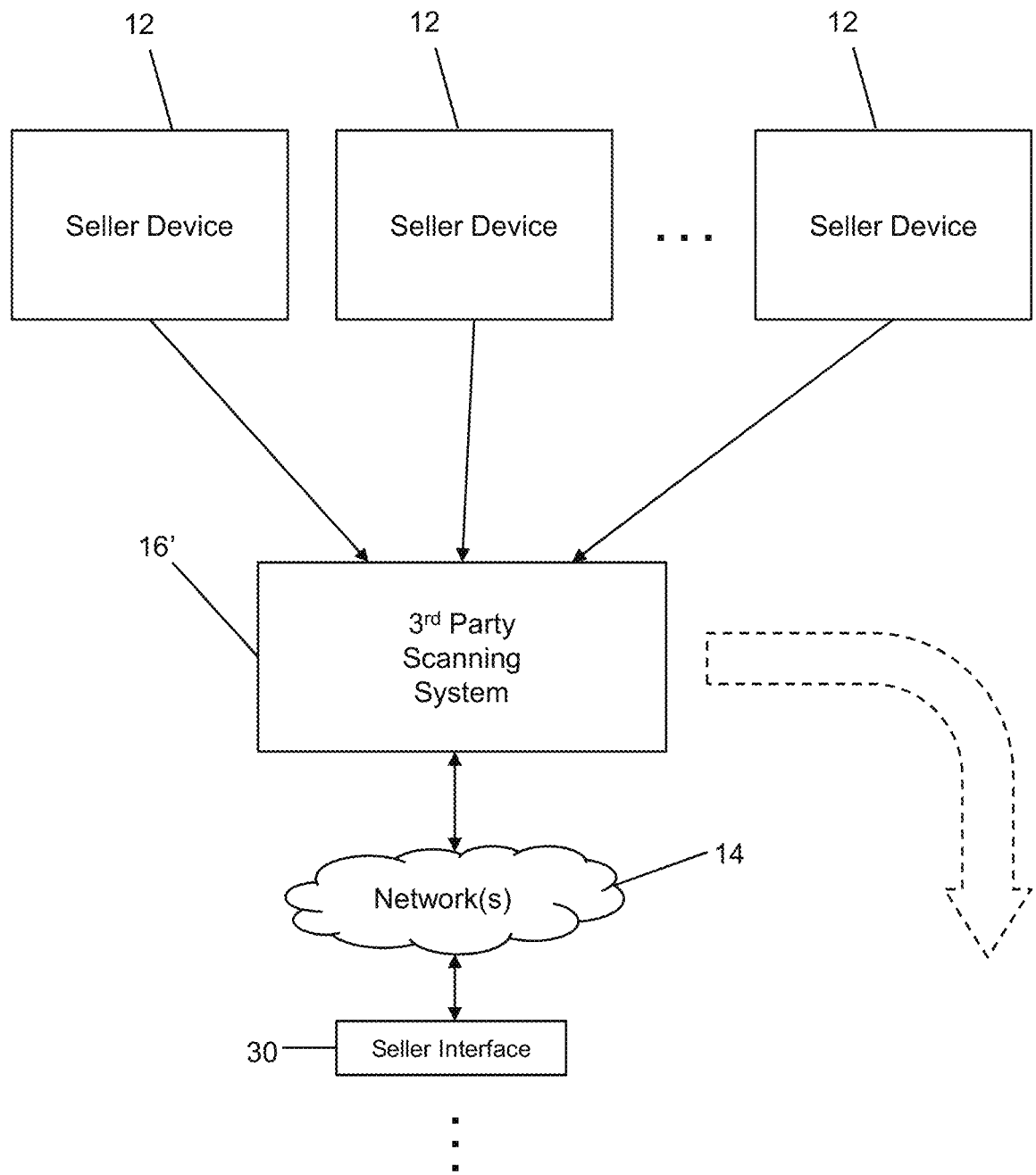
FIG. 1D is a block diagram of a portion of the environment shown in FIGS. 1A and 1B in yet another example configuration.

The scanning operation can also be performed by separate third party entities. For example, as shown in FIG. 1D, multiple sellers can use corresponding seller devices 12 to interface with a $3^{rd}$ party scanning system 16' that itself is interfaced with the seller interface 30 via the network 14. In this way, the $3^{rd}$ party scanning system 16' can service sellers in the scanning operations to avoid the need for at least some sellers to have their own scanning device 16. While the system 16' is shown as being interfaced with the seller interface 30 in FIG. 1D, it can be appreciated that the seller device 12 may also or instead be responsible for electronically transmitting the electronic data to the platform 10 while the $3^{rd}$ party scanning system 16' generates such data for the seller, and may facilitate the physical transportation of the diamonds thereafter as illustrated by the dashed arrow.

As can be noted from FIGS. 1A-1D, there are various elements of the platform 10, or in communication with the platform 10 that can reside in different locations, be provided by different entities, and/or can be arranged in different configurations. The variations illustrated in FIGS. 1A-1D can be provided in any permutation, and in permutations that include other variations without departing from the principles described herein.

Figure 2:
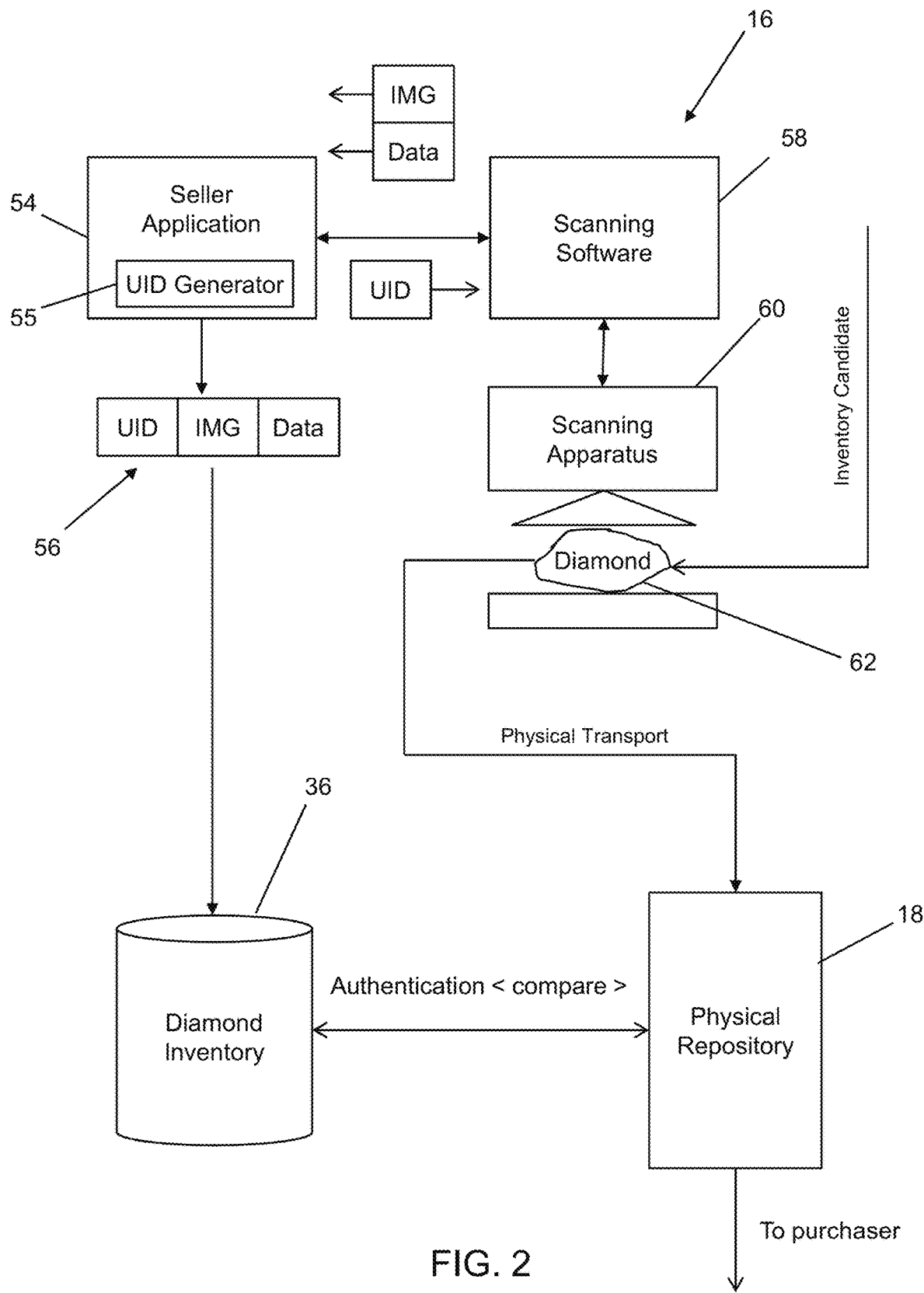
FIG. 2 is a schematic illustration of a diamond scanning process and storage of a diamond data file in a diamond inventory and physical storage of the diamond in a physical repository.

Turning now to FIG. 2, further detail concerning the scanning process is shown. In this example, the seller utilizes their seller device 12 to access or execute a seller application 54, e.g., using an app or browser. The seller application 54 in this example is provided by or otherwise configured to communicate with the seller interface 30. The seller application 54 can also be in communication with scanning software 58 utilized by the scanning system 16 to bind certain data and information to the particular diamond being scanned. For example, the seller application 54 can include a UID generator 55 to create a UID for the diamond. The UID, or a second UID can instead (or also) be created by the platform 10. The UID corresponds to a number that is assigned to the diamond such that the diamond can be specified individually. The UID can be assigned by the platform to offload that aspect of the inventory management from the seller. The seller can, however, also assign their own UID, or adopt the platform's UID, for each diamond they wish to sell individually. The UID(s) can be sent to the scanning software to be associated with the image(s) (IMG) and Data created by the scan and returned to the seller application 54. That is, the UID(s) can be tied or bound to the scan of the diamond, which maps the interior and exterior of the diamond for shape and inclusions. For the following examples, a single UID may be referenced with the understanding that multiple UIDs can be associated with the digital file 56 of a diamond. This enables the seller application 54 to create a diamond inventory data file 56, that includes the UID/IMG/Data. The data file 56 can be considered a "fingerprint" of the diamond, which can be used to check that a physical diamond is the one that is in the digital file 56. The transfers of data shown in FIG. 2 are for illustrative purposes only. For example, the scanning software may not require the UID, and only need to provide the IMG and Data as an output to the scan. Similarly, the IMG and Data could be a raw or other format that is converted to the IMG and Data formats used to create the data file 56. As shown, the inventory data file 56 can be sent to the platform 10 for storage in the diamond inventory 36.

The scanning software 58 can also be used to control the operations of a scanning apparatus 60 used to perform the actual scan to generate the IMG and Data. A diamond 62 is placed in the scanning apparatus 60 and the scanning software operated in order to generate the necessary data to create the data file 56. For example, the diamond 62 can be a rough diamond that is scanned to create a 3D virtual model.

The scanning process can include performing a 3D scan of the interior and a 3D scan of the exterior of each diamond and generating an imaging file (IMG) containing the 3D virtual model and associated information for the rough diamond. The 3D virtual model may be a 3D physical representation of the rough diamond created by combining the two scans. The 3D virtual model may also display the locations of inclusions. The associated information may include the type and location of inclusions, other physical information, or any combination thereof of the diamond.

After the scanning operation is completed, the diamond 62 can be physically transported to the physical repository 18 for at least temporary storage until it is sold and delivered to a purchaser. By having both the data file 56, which provides a "fingerprint" of the diamond 62, and the physical diamond 62 itself, it can be seen that authentication processes can be applied, e.g., to compare diamond inventory items with the physical inventory to ensure that the correct diamond 62 has been added to the platform 10.

As indicated above, while the repository 18 is preferably at, or near, or otherwise accessible to the platform 10, repositories 18 may be distributed around the world in different geographic locations. Each of the repositories 18 may be located in the same area where the rough diamond trading centers are located, specifically, Antwerp, Tel Aviv, Surat, Mumbai, Dubai, Singapore, South Africa, Namibia and Botswana. The location of the scanning system 16 may also be the same or different with respect to the location of the repository 18 and the location of the mining operation. Each repository 18 may be equipped with a computer system to keep track of its inventory (or the seller's inventory). The computer system may be accessible to the central system 34 such that the central system 34 knows which rough diamonds are stored at the repository. Therefore, the physical transportation path shown in FIG. 2 may include other operations, such as tracking, tagging, and logistics integrated into the seller application 54 and/or platform 10.

Figure 3A:
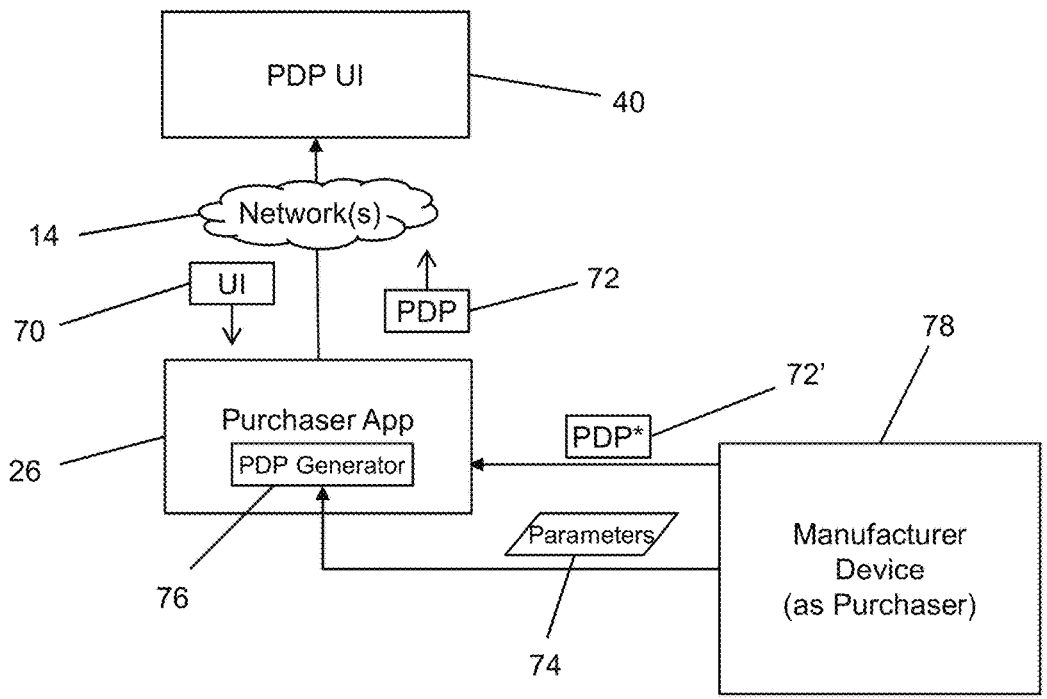
FIG. 3A is a block diagram of an example of a configuration for enabling a manufacture to interact with the platform as a purchaser.
Figure 3B:
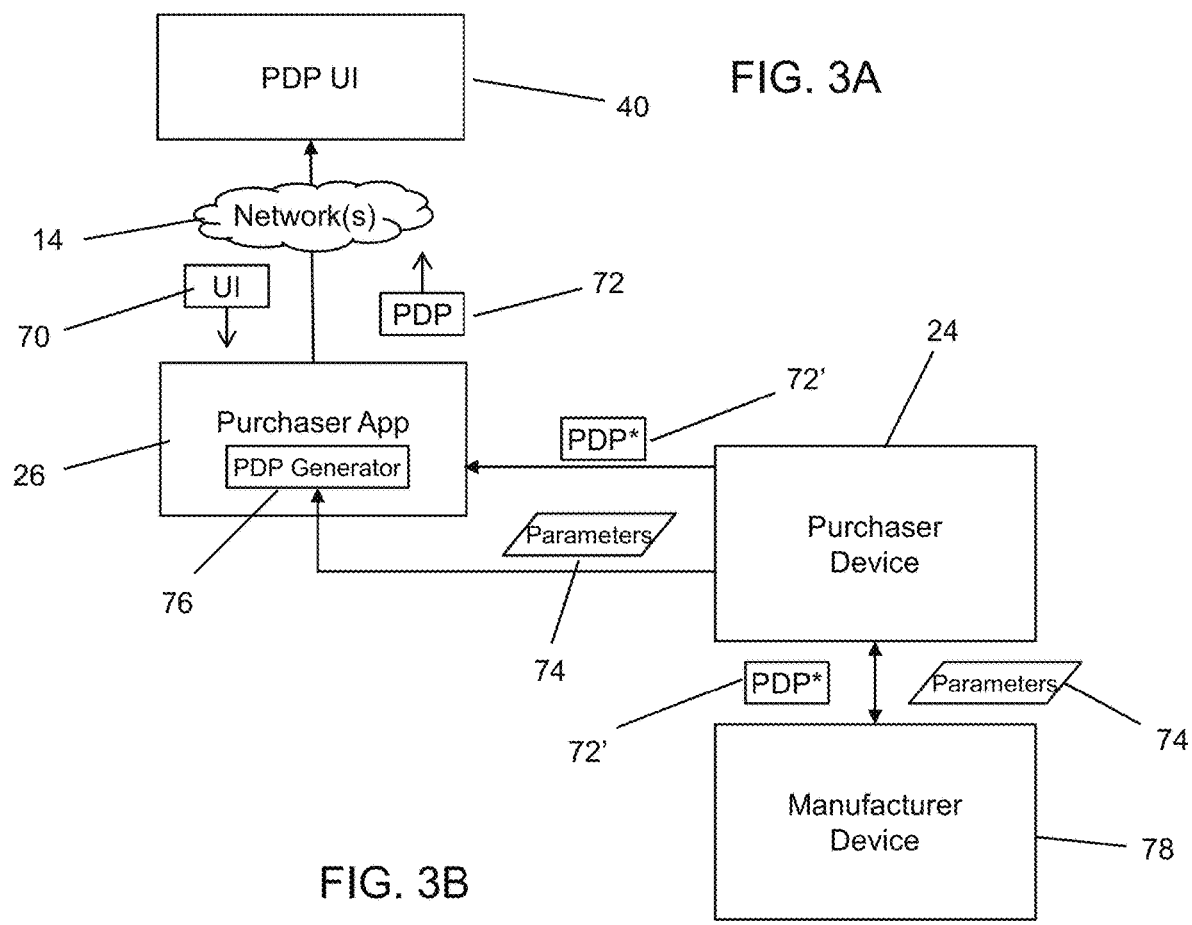
FIG. 3B is a block diagram of an example of another configuration for enabling a manufacture to interact with the platform as a purchaser.

The platform 10 acts as a functional and transactional intermediary between the sellers and the purchasers of the diamonds 62, and effectively "translates" between the seller's diamond-related language and the purchaser's diamond-related language. For instance, the seller may wish to sell individual rough diamonds 62 that have particular characteristics that differ from the polished diamond that a manufacturer intends to create. The scanning processes described above provide an example of how the seller-side can interface with the platform 10. FIGS. 3A and 3B illustrate the interfaces and an example of a mechanism by which a purchaser can post a PDP 72 to the platform 10. The platform 10, by providing a centralized system accessible by multiple sellers and multiple buyers, can generate a wide collection of PDPs 72 from multiple parties, to be stored securely in the PDP database 38. Without a mechanism to create the wide collection of PDPs 72, the individual sale of diamonds may not be optimized for both the sellers and the buyers. It can be appreciated that such a wide collection may include geographically separated purchaser's PDS 72, and may include a wide range of purchasers, from a few to many (or all) purchasers.

As shown in FIG. 3A, the manufacturer, acting as the purchaser, can utilize a manufacturer device 78 and purchaser app 26 to generate a PDP 72. The PDP 72 can include a particular format or represent a collection of data that represents the polished diamond parameters, specifications and any other identifying information. In this example, the purchaser app 26 includes a PDP generator 76 to collect and associated this data, referred to generally as the PDP 72 herein for ease of reference. The PDP 72 can be sent to the PDP UI 40 to provide the PDP 72 to the platform 10 via the network 14. The PDP UI 40 can also provide a UI 70 to be rendered by the purchaser app 26 in order to enter data and create the PDP 72. It can be appreciated that the delineations shown in FIG. 3A are illustrative only, and other arrangements can be used, for example, wherein the UI 70 is hosted at the platform 10 using the PDP UI module 40 via a browser instead of the app 26. The manufacturer device 78 can also provide revised PDPs* (denoted by "*") 72' which can also be PDP overwrites that allow existing PDPs 72 and/or PDP parameters to be tweaked for a particular order. Also, as illustrated in FIG. 3A, the PDP generator 76 can include one or more screens allowing for the entry of the individual parameters 74 or the revised or overwritten PDP* 72'.

FIG. 3B provides an illustrative variation to the configuration shown in FIG. 3A in which a separate purchaser interacts with the platform 10 on behalf of a manufacturer. For example, a retailer or wholesaler may engage with the platform 10 to purchase the desired rough diamonds that are then processed by a separate manufacturer. In this example, the manufacturer device 78 can be used to communicate with the purchaser device 24 to provide the PDP parameters 74, revised PDP* 72', etc.

Figure 4:
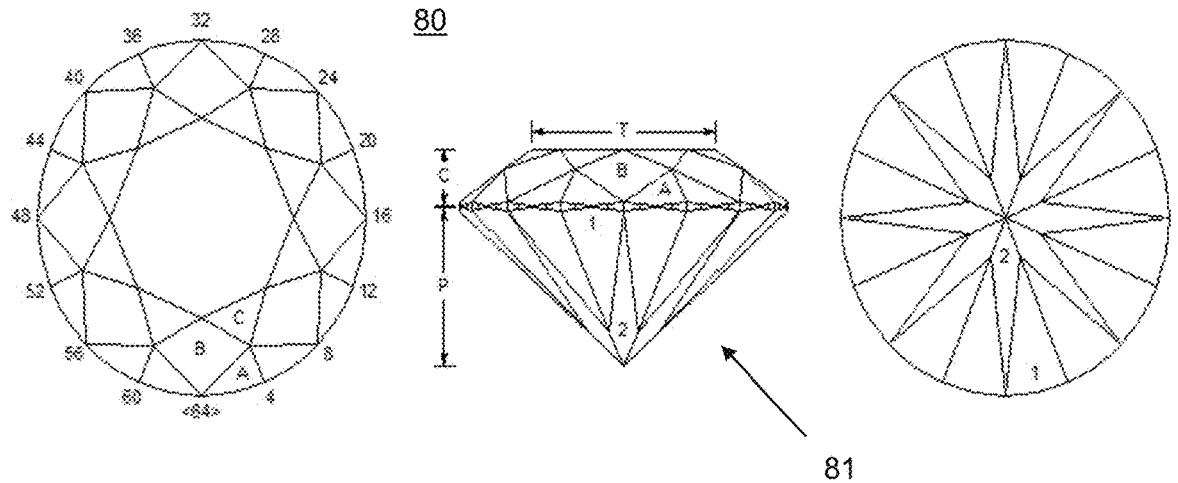
FIG. 4 is a schematic diagram of a polished diamond illustrating various parameters thereof.

In the context of buying rough diamonds, each purchaser typically has its own unique manufacturing processes that are suitable to polish certain types of rough diamonds and that can produce polished diamonds unique to their manufacturing specifications and polished diamond distribution. Polished sales distribution refers to the purchaser's unique network of customers who have their own set of unique parameters and specifications when purchasing and costing polished diamonds. A polished diamond parameter can include a facet arrangement and corresponding range of angles and ratios which define a particular diamond shape or cut unique to a purchaser. The information may include variable angles, depths, shapes, length to width ratios, and other information such as price schemes. Each purchaser can have multiple sets of polished diamond parameters for each diamond shape. FIG. 4 provides a visual illustration 80 of such parameters of a proposed polished diamond 81. Referring to FIG. 4, it may be noted that tolerances provided in a PDP 72 can include different angles and sizes of each facet (e.g., A, B, C, 1, 2). It can also be appreciated that further detailed polished characteristics can be added to PDPs 72 over time, and thus the platform 10 can be configured to update the PDP entry mechanisms accordingly.

The PDP 72 includes a purchaser's customer's unique parameters and specifications when purchasing and costing polished diamonds. Because the information may reveal the purchaser's proprietary manufacturing processes and unique network of customers, the PDPs 72 are preferably stored as confidential and proprietary information. Thus, the information is provided by the purchaser to the PDP database 38 (via the platform 10 or third party PDP system 50, and should only be made accessible to its owner and the central system 34. While other purchasers may access the central system 34 and platform 10 more generally through their computing devices 12, 24, 78, the PDPs 72 stored on the PDP database 38 for each purchaser should not be made available to one another and should be maintained confidential throughout the operation of the platform 10.

The central system 34 may perform the aforementioned functionalities in response to an order placed by the purchaser through its purchaser device 24. Although the order may be related to the purchase of one or more rough diamonds 62 located in the repository 18, the order relies upon the PDPs 72, which specify characteristics that are specific to polished diamonds and in particular values or information (e.g., the digital file or association with the digital file specifying that manufacturers desired polished diamond cut) that are a baseline for the polished diamond that the purchaser has the objective to manufacture, rather than rough diamond criteria ("polished diamond order" may be used as a term to refer to this). The polished diamond order can include the PDP 72, which can include polished diamond criteria such as size, weight, color, and clarity, the number of diamonds in the polished diamond order, a bid price list including a bid price for each criteria, and a discount or adjustment for fluorescence. That is, the bid price can represent a combination of some set of criteria, and discounts or adjustments for values of other individual criteria. Other criteria can be included or are contemplated and would be evident as applicable from the disclosure but the polished diamond order as explained includes a baseline or grouping of parameters that are specific only to ordering polished diamonds that allow for the bidder to define in virtual terms a polished diamond that the purchaser seeks to obtain through the purchase of a rough or semi-polished diamond. For example, a polished diamond order by a purchaser may indicate that the purchaser needs 100 of 1.00 carat oval polished diamonds (with associated proprietary manufacturing information) that have a color greater than or equal to J and a quality greater than or equal to SI. Rough diamonds in the diamond inventory 36 can be searched and analyzed to evaluate if they could be manufactured to satisfy the polished diamond order.

The polished diamond order may or may not include requirements or specifications, or permit the user to enter a requirement or specification that is particular to rough diamonds 62 and would be understood to correlate to specifying characteristics of a rough diamond. The central system 34 may provide the PDP UI 40 to allow the purchaser to enter its orders through its purchaser device 24, via the purchaser interface 32 provided by the platform 10.

Figure 5A:
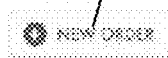
FIG. 5A is a screen shot of a user interface listing orders for diamonds listed via the platform.
Figure 5B:
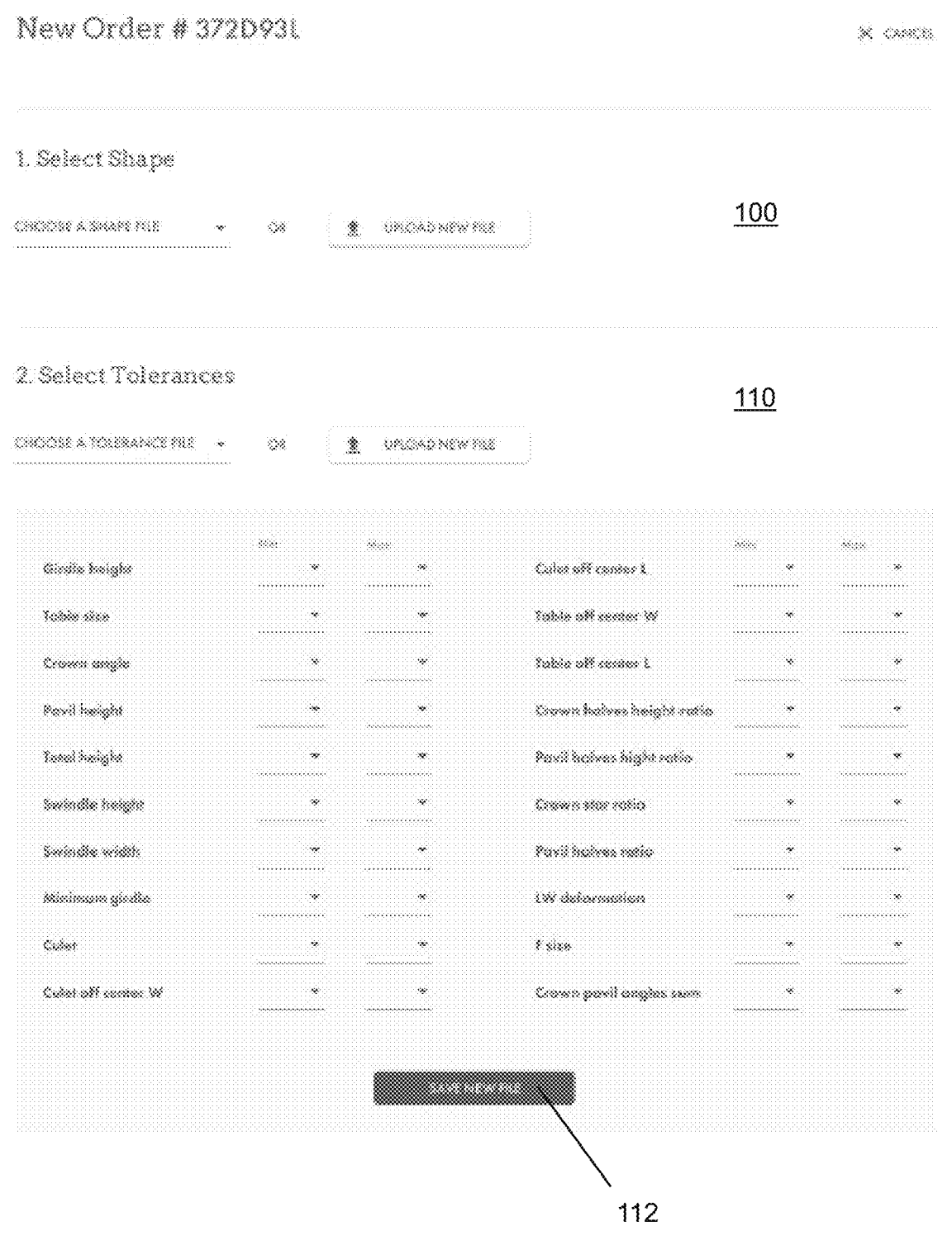

Example screen shots that can be provided by the PDP UI 40 in order to have a purchaser enter parameters to effectively create and provide a PDP 72 are shown in FIGS. 5A-5D. FIG. 5A illustrates an orders screen 90 that lists the various polished diamond orders being handled by the central system 34 for a particular purchaser. The orders screen 90 can include a row for each order, which can include a status of that order, for example, incomplete, suspended, submitted, matched, etc. A new order option 92 can be selected to allow a purchaser to create a new polished diamond order, by creating a new PDP 72 as shown in FIG. 5B.

Turning now to FIG. 5B, a first portion 100 of a PDP creation screen enables the user to select the shape for the diamond, e.g., by choosing a shape file that exists in the system, or by uploading a new shape file. A second portion 110 of the PDP creation screen enables the user to select tolerances for the polished diamond order. A tolerance file can be selected or uploaded, if such a file already exists. Alternatively, the various tolerances can be manually entered in the second portion 110 of the PDP creation screen. When tolerances are manually entered, a save new file option 112 enables the purchaser to save those tolerances for a future order.

Figure 5C:
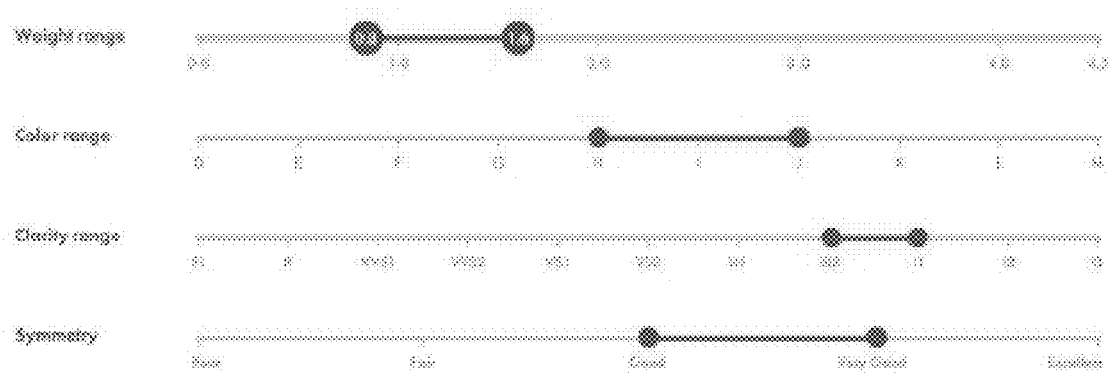
FIG. 5C is a screen shot of a user interface for setting filters and selecting pricing parameters for the new diamond order.
Figure 5C:
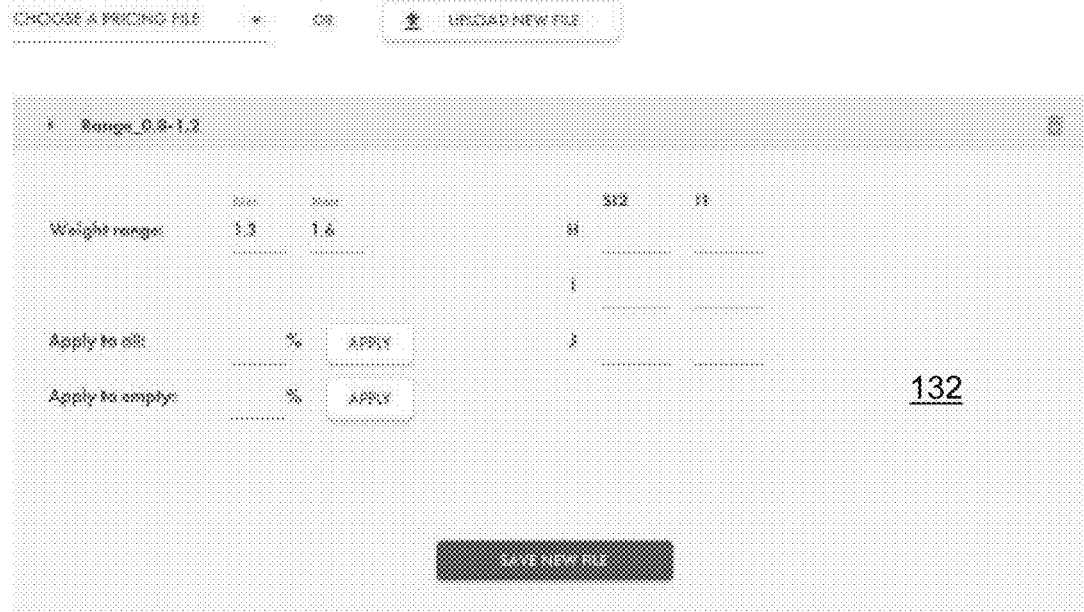

Turning now to FIG. 5C, a third portion 120 of the PDP creation screen enables the user to set filters, e.g., to specify ranges of weight, color, clarity and to specify symmetry. A fourth portion 130 of the PDP creation screen is also shown in FIG. 5C, which enables pricing to be added. An existing pricing file can be selected or uploaded, or new pricing parameters entered in the entry area 132. The pricing parameters can include, for example, price per carat. In the example shown in FIG. 5C, the option "Discount below XX" is selected, wherein "XX" represents an industry standard/accepted pricing scheme. In this way, instead of dollar values, the user entered a percentage discount below an industry standard price list.

Figure 5D:
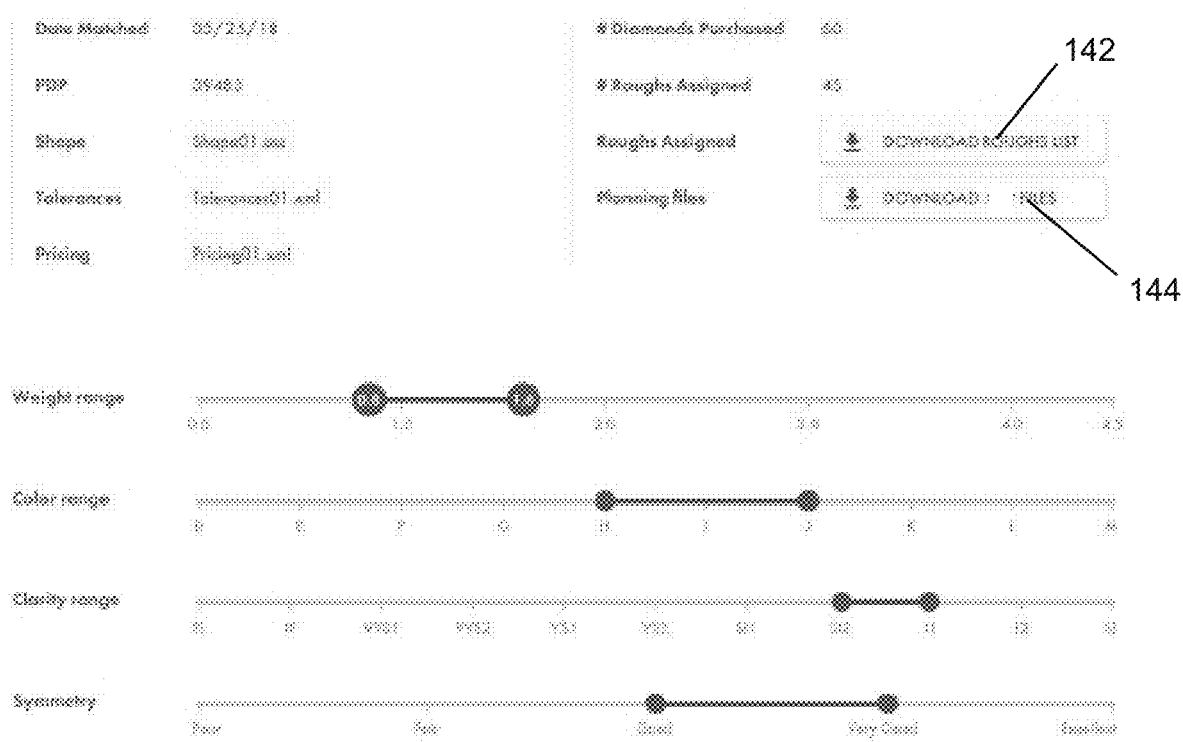
FIG. 5D is a screen shot of a user interface summarizing the details of a new diamond order.

FIG. 5D provides a summary screen 140 to enable a user to review the details of an order that has already been created. In this example, the summary screen 140 lists the shape/tolerances/pricing of the order, and shows the details greyed out since they would not be modifiable while the order is active. A download roughs list option 142 can be selected to download a list of rough diamonds already assigned to the order, and a download files option 144 can be selected to download planned round scans to help in manufacturing. The scan file is a file containing internal and external characteristics of the diamond, as discussed earlier.

Figure 6:
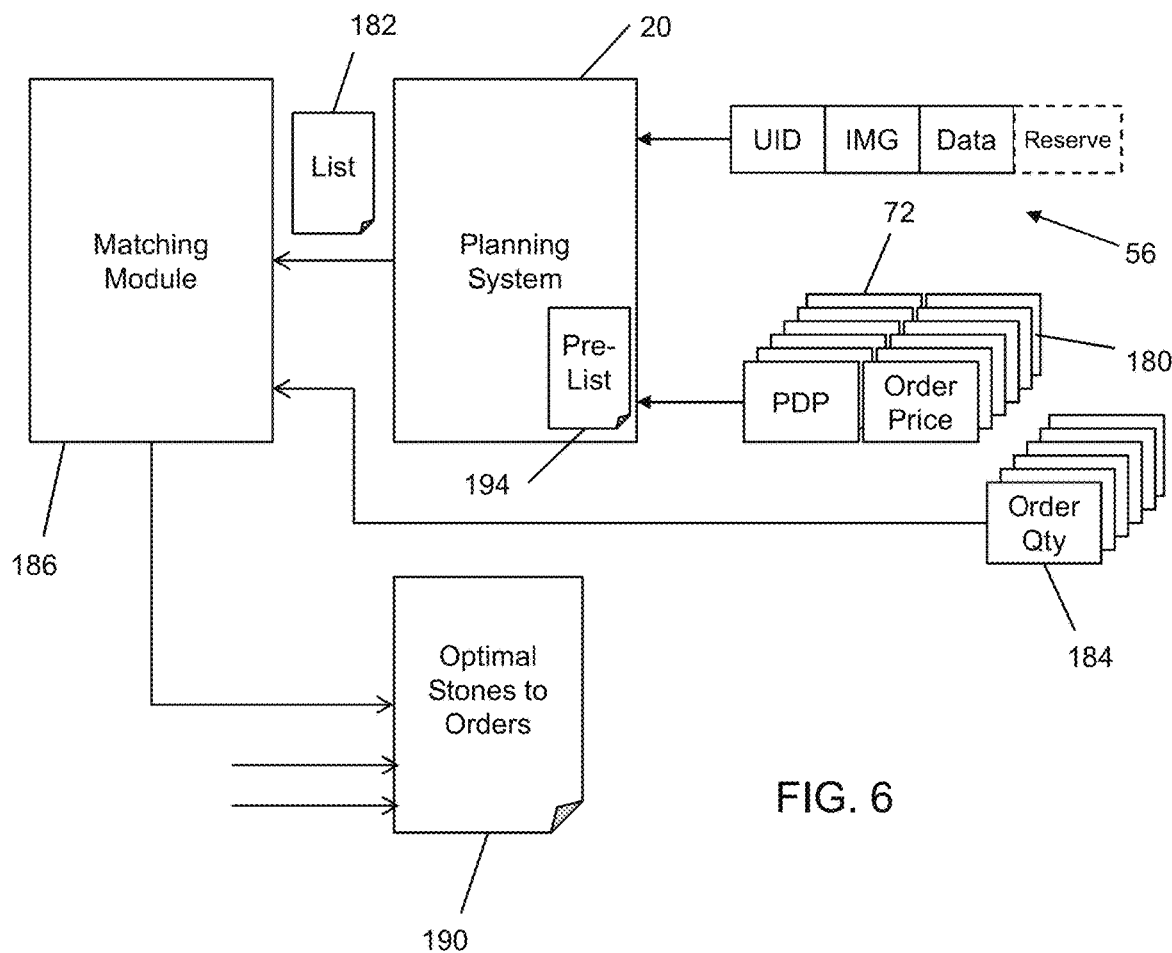
FIG. 6 is a schematic flow diagram showing a planning and matching process implemented by the central system.
Figure 7:
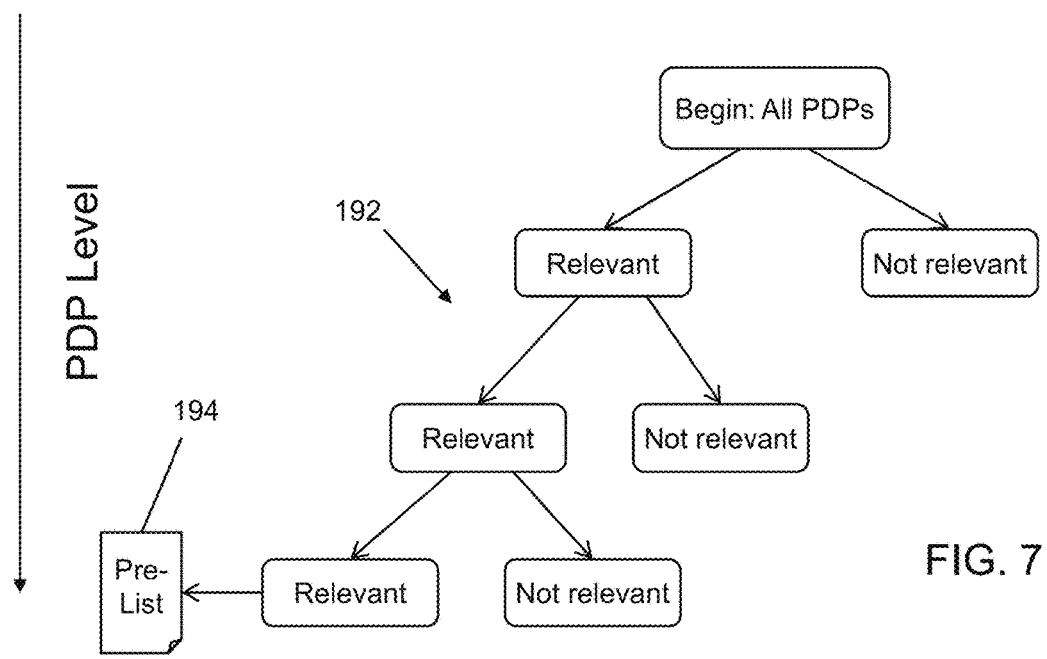
FIG. 7 is a schematic diagram of a PDP elimination tree for pre-planning.
Figure 8:
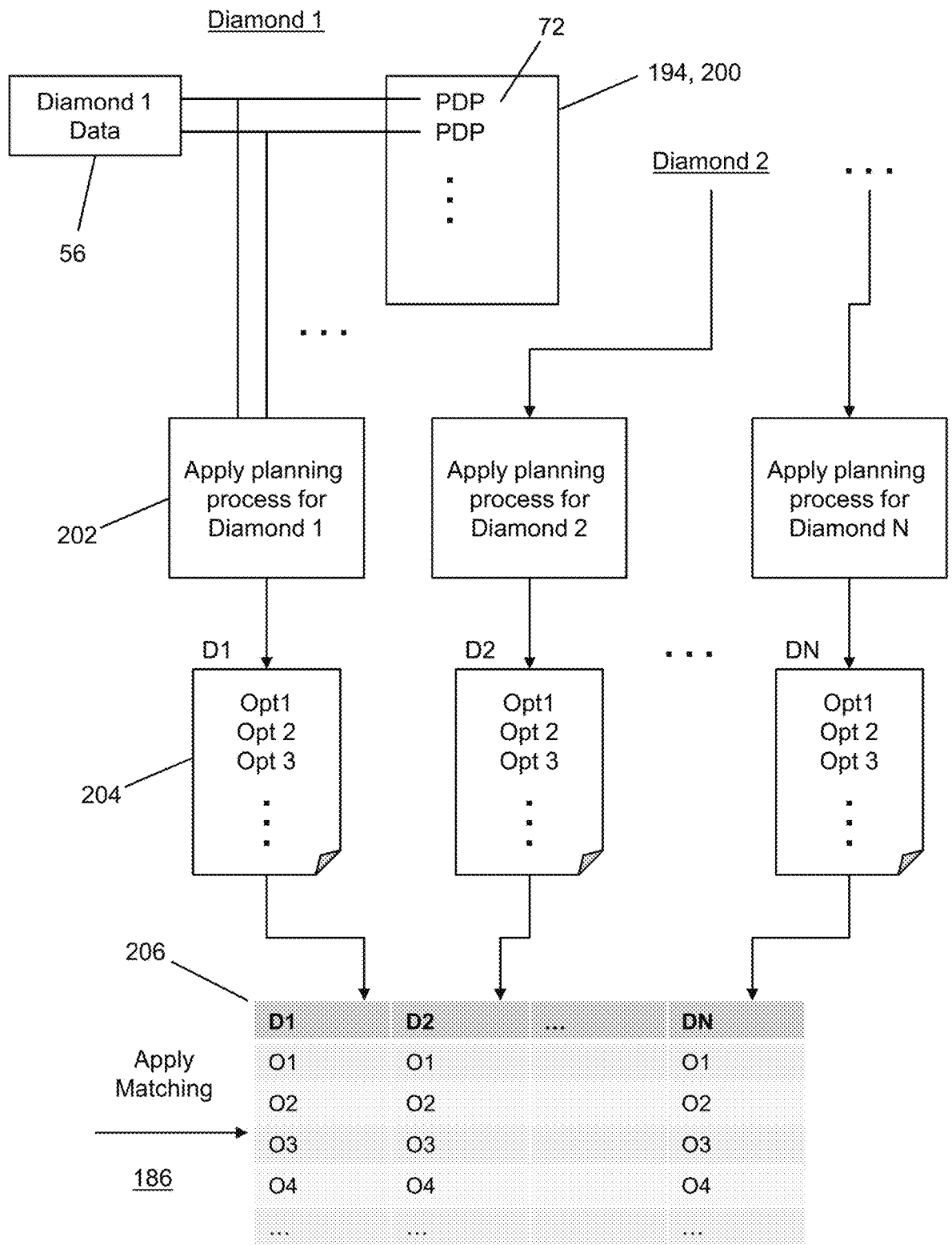
FIG. 8 is a schematic flow diagram illustrating an example of the planning and matching process shown in FIG. 6.

As discussed above, the platform 10, using the central system 34 and planning system 10 analyzes each diamond 62 added to the platform 10, to determine if that diamond 62 is suitable for any one or more of the PDPs 72 provided by the various purchasers. In this way, each diamond 62 can be individually matched with polished diamond orders that optimize the options collectively. FIGS. 6, 7, and 8 provide further detail regarding the planning and matching processes.

Referring first to FIG. 6, the planning and matching processes are shown schematically wherein the planning system 20 utilizes the data file 56 associated with a particular diamond 62 in the system to determine which in the global collection of PDPs 72 stored in the database 38 can apply. As shown in FIG. 6, all PDPs 72 and their associated order prices 180 can be evaluated against each particular diamond 62 using the planning system 20. This effectively offloads the planning process from the manufacturer, who would normally need to do this after having purchased an assortment of rough diamonds. Not only does the configuration of the platform 10 offload the computational processing, it streamlines the manufacturing process by allowing a purchaser to be automatically provided with suitable diamonds 62, and on an individual stone basis. The data file 56 can optionally include a reserve price for the diamond 62 being sold. For example, if that diamond 62 was part of an assortment purchased through traditional channels, the reserve price may correspond to a reserve for the entire assortment, with the planning system 20 processing the diamonds 62 individually to apportion the amount of reserve to each stone, while ensuring that the overall reserve price is met for the assortment. Individual diamonds 62 can also be given a reserve price, if such information is known. It can be appreciated that reserve prices may not be required, particularly if the platform 10 provides a flat charge per transaction.

The planning system 20 first analyzes the data file 56 against all PDPs 72 to remove at least some irrelevant PDPs 72 and generate a pre-list 194. The pre-list 194 is then used by the planning system 20 to generate an output list 182 that includes PDPs 72 from the pre-list 194 that could be fulfilled using that particular diamond 62. The output list 182 is then used as an input to a matching module 186 that can be operated by the central system 34 to generate a matching output 190 that provides an optimal stones to orders mapping, along with matching outputs for other diamonds 62. Because of the computational resources that may be required to process all of the PDPs 72, certain optimizations can be applied. For example, as shown in FIG. 7, a pre-processing algorithm 192 can be applied to filter out PDPs 72 that clearly do not apply, for example, based on the order price 180 or other characteristics such as shape, color, weight, fluorescence, and/or inclusion type. Other assumptions can be made, such as that the yield (i.e. percentage of polished diamond/rough or starting weight (in carats)), would likely never be better than a particular level (e.g., 60%), further removing PDPs 72. Various levels of the PDPs 72 can be used to separate relevant from not relevant PDPs 72 at each level to generate the pre-list 194 that can effectively reduce the number of PDPs 72 to be used in the planning process. It may be noted that more than one PDP 72 may apply to a single diamond 62, if more than one stone can be cut from the same rough diamond 62 for example. Therefore, PDPs 72 may need to be considered together to optimize the matching of the diamond 62 to the orders. This can be done by considering PDPs 72 from the same manufacturer at the same time, e.g., as sets, or by allowing the same rough diamond 62 to be sawed and thus separated to sell a portion thereof to one purchaser and one or more other portions to other purchaser(s). The planning system 20 can be configured to account for either or both scenarios, depending on the permissions provided to the platform 10, by the sellers and purchasers. As shown in FIG. 7, the matching module 186 can consider order quantity 184 associated with the PDPs 72 to determine optimal matches. For example, with large order quantities and limited supply, a PDP 72 may be less likely to be matched.

FIG. 8 provides an example of the planning and matching processes performed for a plurality of diamonds 62, referred to as Diamond 1, Diamond 2, . . . Diamond N. In this example, the data file 56 for Diamond 1 is evaluated in the context of the PDPs 72 from a pre-list 194 or other collection 200 of PDPs 72, including the global collection from the database 38. The planning process is applied at step 202 for Diamond 1, and generates a list of options 204 for Diamond 1. The options (Opt 1, Opt 2, etc.) specify which PDPs 72 can be fulfilled by that particular diamond, according to the parameters of the PDP 72 and the order price. This planning can include iterating through different tolerances specified in the PDPs 72 to find the most number of acceptable options. This process can be performed for each diamond 62, preferably in parallel as shown in FIG. 8, to generate a list of options 204 for each of the diamonds that create a matrix of options 206 to which the matching process 186 is applied.

It can be appreciated that various metrics and methodologies can be used to perform the matching process 186 in order to optimize all orders simultaneously. For example, all possible combinations can be analyzed to determine the best price for each diamond 62 that collectively satisfies the most orders, and/or that maximizes the overall value. It can be appreciated that with an infinite or near infinite supply of diamonds 62, every PDP 72 can be satisfied using optimal tolerances and ranges. Likewise, with a large demand from the PDPs 72, the best prices should be obtained for each diamond 62. Given the actual supply and demand entered into the system, the matching module 186 can apply an optimization algorithm to achieve the best overall outcome. In an example, one approach to matching can include a "knapsack" like algorithm that looks at all permutations in order to optimize/maximize a certain objective, such as overall value. Other, less intensive approaches could instead be used, for example a greedy approach, or one that satisfies certain business or non-monetary constraints, such as to maximize the number of orders completed, meeting certain due date orders, prioritizing for certain timelines, etc.

Figure 9:
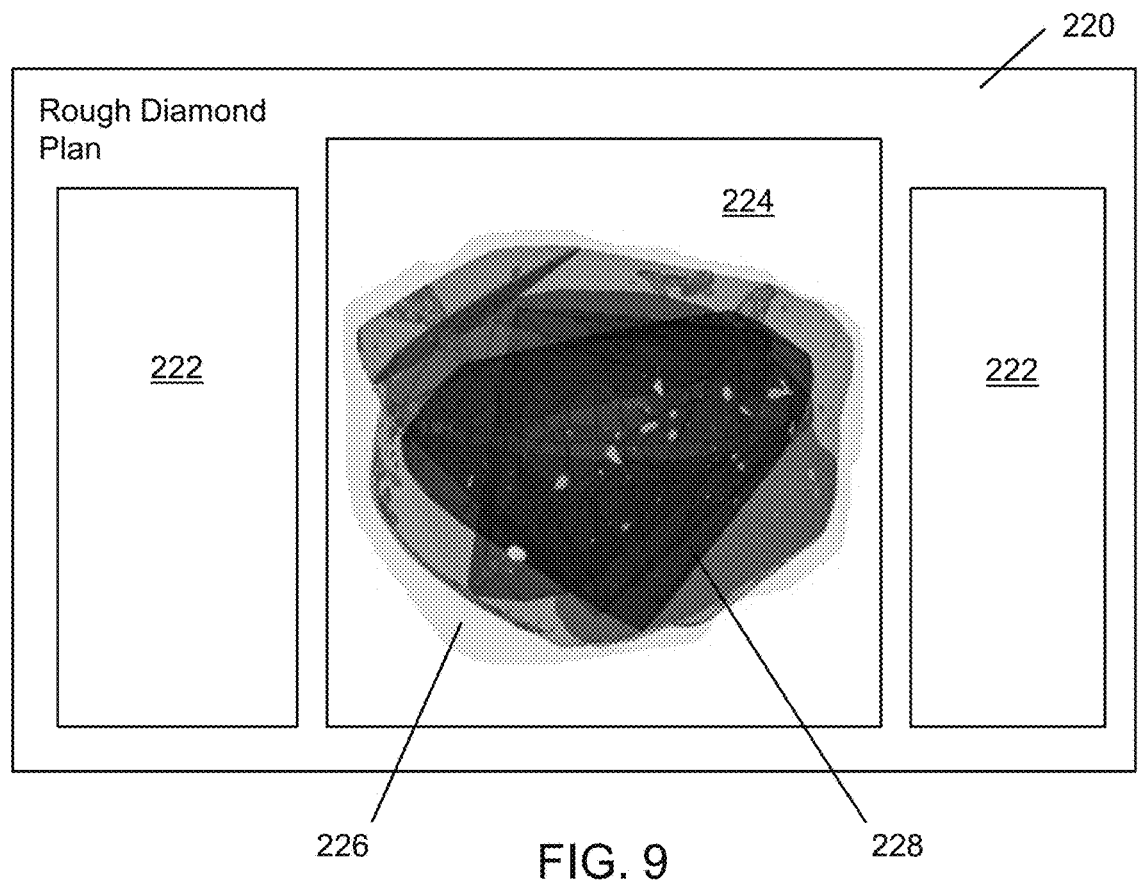
FIG. 9 is a screen shot of a user interface for visualizing a planned rough diamond.
Figure 10:
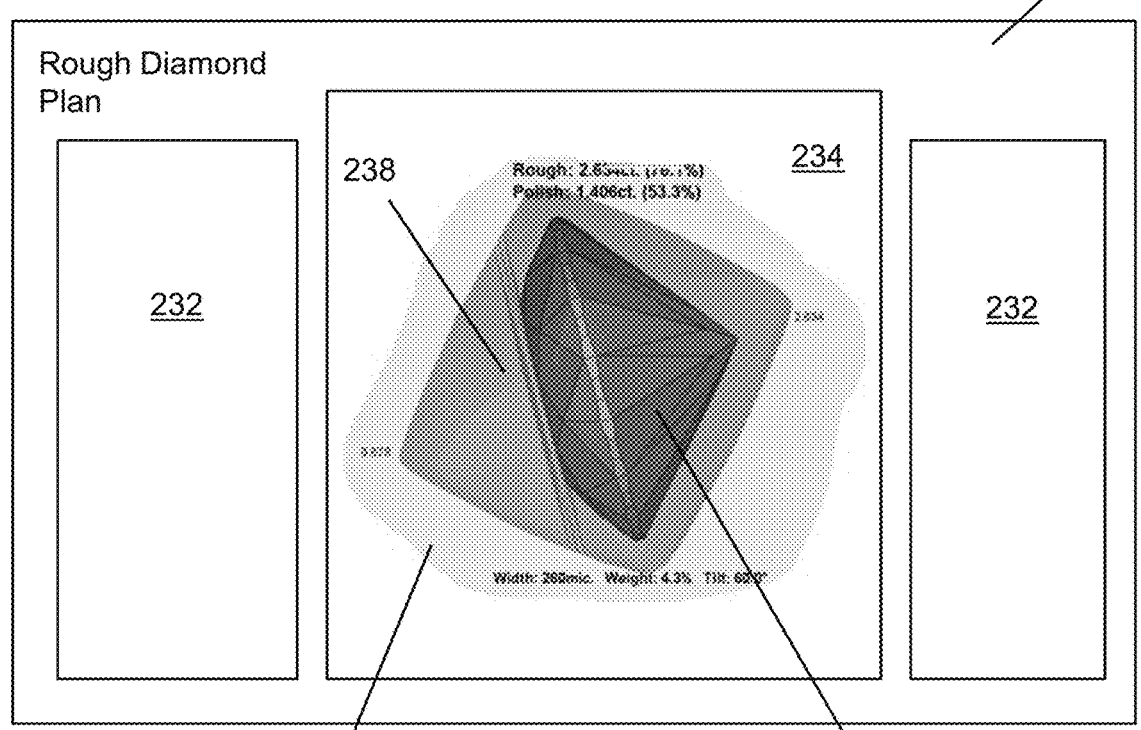
FIG. 10 is a screen shot of another user interface for visualizing a planned rough diamond.

Turning now to FIGS. 9 and 10, the planned diamonds can have associated therewith a visual output, similar to what is generated using traditional planning methods utilized by manufacturers. In FIG. 9 a diamond plan UI 220 is shown, which includes a 3D rendering 224 of a rough diamond 226 overlaid with a proposed polished diamond 228 according to the matched PDP 72. The UI 220 can be provided with various interface tools 222 to interact with the rendering 224 to visualize different views, access associated information, etc. The rendering 224 can be delivered to the purchaser upon completion of the transaction settlement, or at any time thereafter. FIG. 10 provides another rendering 234 that shows a first portion 236 of a rough diamond 226 with a polished diamond overlaid, but also showing that a second portion 238 of that rough diamond 226 would be available for planning at least one additional polished diamond. For example, this view can be used to determine what remaining rough diamond is left after fulfilling the order to allow for an additional PDP 72 to be found, from that manufacturer or another purchaser. It can be appreciated that the renderings shown in FIGS. 9 and 10 are illustrative only. For example, the rendering shown in FIG. 9 shows multiple polished options occupying the same space, and may not be shown to a user. Instead, the user may be provided with a rendering such as that shown in FIG. 10, which can also include a second planned stone in the second portion 238. By loading the plan into their own software, the users can be provided with the ability to hide or show any part of any of the various options generated by the plan. In this way, the user can choose any combination of overlapping or non-overlapping polished diamonds to view.

The platform 10 and central system 34 can be configured to automate at least some portions of the processes described herein, and to apply intelligence in conducting its operations. For example, when a diamond order is received by the central system 34, the central system 34 can access all the files 56 and PDPs 72 from the system and perform the planning process to determine all of the rough diamonds (or semi-polished if applicable) that are suitable for that purchaser's polished diamond order and may provide the purchaser with the rough diamonds which satisfy the purchaser's polished diamond order based on the purchaser's own profit determination, or based on intelligence within the system to evaluate the profitability using the purchaser's financial information. That is, the platform 10 can be operated, in some circumstances, to prioritize filling an order as opposed to maximizing value, for example, if additional stones are needed to finish a diamond necklace. The profit for the purchaser would be the value differential between the resulting polished diamond and the cost of the rough diamond. The order can further govern the determination step by determining only rough diamonds that meet the order requirements from all the potential rough diamonds and creating an evaluation file for each of the rough diamonds that meet the order requirements. In some embodiments, the central system 34 may perform the aforementioned functionalities periodically. In this situation, all the suitable rough diamonds are determined before the order and the order instructs the central system 34 to determine and output rough diamonds that meet the order requirements from those diamonds 62.

In some embodiments, the central system 34 may perform the aforementioned functionalities as, if desired, the purchaser is permitted to browse through the inventory of imaging files. In this situation, the imaging files may already be available on the central system 34 or be accessed and be available in real-time to the central system 34. When the purchaser browses a rough diamond, the central system 34 may initiate performing the analysis and the output step for the diamond, according to the computing resources available. It can be appreciated that the platform 10 can also provide an option to view the scan files, which can be done relatively quickly and may not be as dependent as the complete planning process on computing resources.

As partly discussed above, the central system 34 may be configured to include intelligence using software programming that controls the operation of the central system 34. As such, the central system 34 may be configured to implement certain advances in the execution of individual transactions for the sale and distribution of rough diamonds. In one approach, the central system 34 is configured to implement operations in which a period of searching or data collection is conducted over period of time that is used to find and identify whether the virtual model of a particular rough diamond satisfies two or more polished diamond orders, compares the bid prices in the polished diamond orders, and selects the polished diamond order that provides the highest bid price (among the matching polished diamond orders). This would be an automated process (without requiring human or manual intervention). It would provide improved financial performance from the perspective of the platform 10.

Another intelligent component that can be implemented relates to improving operation of the rough diamond market for the purchasers. The central system 34 is configured to implement operations or computer implemented processes in which a period of searching or data collection is conducted over a period of time that is used to find and identify whether two or more virtual models of corresponding rough diamonds 62 satisfy an individual PDP 72, compares the ask prices for the corresponding rough diamonds 62, and selects the rough diamond 62 that provides the lowest ask price (among the matching rough diamonds or polished diamond orders from different purchasers). This would be an automated process (without requiring human or manual intervention). It would provide improved financial performance from the perspective of the purchasers.

There can also be automated intelligence related to the orders. In some embodiments, the central system 34 can be configured to analyze orders and make a determination with respect to the process that should be implemented to fill the order within the system. The central system 34 can be configured to handle small orders differently than large or recurring orders. A small ask order (e.g., small polished diamond order) can be one that is relatively small compared to the volume of rough diamonds that are available in a period of time or for example, it can be 10% or less of the volume of available rough diamonds through the central system 34 in a month. In a related aspect that can also be implemented to incorporate intelligence into the overall system, the central system 34 can control which events or at what locations the processing that selects or intelligently matches bids and ask is performed. The central system 34 can trigger an evaluation when each individual rough diamond enters the overall system. The loading of individual virtual models at repository can trigger this evaluation and consequently the matches. The operation can be performed in different locations and in parallel which can expedite the completion of large recurring orders. The operation can be performed when a new bid order (or new bid orders) is received by the central system 34. If for example, it is an order for a small number of diamonds, the central. system 34 can trigger a search (at or from the central system 34) to find the necessary rough diamonds from all currently available rough diamonds in the system (e.g., all repositories). These features would be an automated processes (without requiring human or manual intervention).

In some embodiments, the central system 34 can be configured to receive a polished diamond order, evaluate the rough diamond collection in the inventory 36, and the PDPs 72 in the order to identify rough diamonds 62 that match the PDPs 72, rank the identified rough diamonds based on the difference between the bid price and the sell price, allocate the identified rough diamonds to the matched order based on the rank, and provide imaging files with the renderings 224, 234, of the allocated diamonds to the purchaser submitted the order. The identified rough diamonds 62 can also have a bid price at or above the ask price. In operation, the identified rough diamonds may be ranked from highest difference to lowest difference. The platform 10 may implement an operation to address "over-matching," when the system identifies a number of matching rough diamonds 62 that are greater than is required in that order. It can do so by allocating based on the rank that is determined using the order price difference. More specifically, when the polished order specifies a total number of polished diamonds that can be manufactured from rough diamonds 62 (or a number of rough diamonds 62 for one of multiple criteria in the order) that is less than the total number of identified polished diamonds 62, the total number specified in the order (or the number of rough diamonds 62 for that one criteria) may be the number of identified polished diamonds 62 to be allocated to the order (or the criteria), and the allocation may start from the identified rough diamond 62 with highest difference toward the identified rough diamond 62 with lowest difference until the order (or the criteria) is fulfilled. Therefore, rough diamonds 62 with highest difference may always be allocated to the order for polished diamonds (or the criteria). When the polished diamond order specifies a total number of polished diamonds that can be manufactured from rough diamonds 62 (or a number of rough diamonds 62 for one of multiple criteria in the order) that is more than the total number of identified polished diamonds 62, all the identified diamonds 62 may be allocated to the order (or the criteria).

The central system 34 may also keep track of the number of outstanding diamonds 62 in the order (or the criteria) and may repeat the above steps (namely, the evaluation step, the rank step, the allocation step, and the imaging file providing step) until the order (or the criteria) is completely fulfilled.

The aforementioned processes describe intelligent processes that are implemented such as when one purchaser places a polished diamond order, the central system 34 searches and locates the most suitable and competitively priced rough diamonds 62 to satisfy the purchaser's polished diamond order. The central system 34 is also configured to permit multiple purchasers to place competing polished diamond orders. When these orders are submitted, the central system 34 can search and locate the most suitable and competitively priced rough diamonds 62. When there are rough diamonds 62 suitable for and can be allocated toward more than one of these orders, the central system 34 can allocate those rough diamonds 62 to the order with the highest bid price.

As illustrated in FIG. 8, the process advantageously has the central system 34 aggregate all of the competing polished diamond orders using active PDPs 72 associated with those orders. The aggregated orders may be referred to as the order collection and be stored in the PDP database 38. The central system 34 searches and analyses each rough diamond 62 in the diamond inventory 36, and allocates each suitable rough diamond 62 to the purchaser with the highest ask price in their respective polished diamond order.

There can also be automation related to new rough diamonds 62 entering the platform 10. In some embodiments, the central system 34 can be configured to detect if a new rough diamond 62 has been processed by the planning system 20, access the order collection and determine if the new rough diamond 62 matches one or more orders in the order collection based on the PDPs 72 in the order when the platform 10 detects that the new rough diamond 62 has been processed by the planning system 20, rank the matched one or more orders based on the difference between the bid price and the ask price, allocate the new rough diamond to the order with largest difference, and provide the file 56 of the new rough diamond 62 to the purchaser of the order with largest difference. The one or more orders may be ranked from highest difference to lowest difference. When there are two or more orders with the same amount of difference, the new rough diamond 62 may be allocated to the order with a smaller number of outstanding rough diamonds 62 so that order can be fulfilled first and the number of outstanding orders on the platform 10 can be reduced more quickly. The central system 34 may also keep track of the number of outstanding diamonds 62 in each order and fulfill each order by performing the above steps until the order is fulfilled. The central system 34 can ensure that the new rough diamond 62 is sold to the purchaser who is willing to pay the highest price for the diamond based on that purchaser's PDP 72, or can perform a global matching as shown in FIG. 8 to achieve the best overall result.

Since a file 56 is associated with only one rough diamond 62, a seller can list the rough diamonds 62 in its inventory individually, rather in assortments or groups, through the central system 34. The sale price for each rough diamond may be stored in a sale price database (not shown) or in the diamond inventory 36. The sale price or the database may be restricted so as to not provide access to purchasers. The central system 34 may also allow purchasers to submit orders and to browse each seller's inventory and submit a purchasing price for the rough diamond 62 it would like to buy. The orders or the purchasing prices, whether it is the purchasing price in an order or the purchasing price submitted while browsing, may be stored in a purchasing price database (not shown) or in the PDP database 38. The purchasing price or the database may be restricted so as to not provide access to the sellers.

The rough diamond inventory 36 may include all the available rough diamonds 62 on the central system 125 or be referred to as the rough diamond collection. As described above, each rough diamond 62 in the rough diamond collection is scanned by the imaging system and is provided with a file 56 that contains a 3D virtual model and associated information for the rough diamond 62. Each seller may also provide additional information that includes shape, color, weight, fluorescence, inclusion type, yield level, and minimum seller price of the rough diamond 62 for each rough diamond 62 in its inventory. The additional information may be stored in the same database 36 in which the rough diamond collection is stored, which is accessible by the central system 34. The collection may be updated automatically whenever a new rough diamond 62 is processed by the scanning system 20.

The entry of individual new diamonds 62 into the scanning system 12 or repository 18 can trigger a process to identify the matching orders and allocation. The process can be performed in parallel (e.g., simultaneously) at different locations and the central system 34 will then resolve conflicts (e.g., overmatching) when it receives related information. The matching and allocation to orders can also be triggered when a new order is received which may involve transmitting order information to such distributed locations.

From the sale price (or the ask price) and purchasing price (or the bid price), the central system 34 can determine whether the bid price is at or above the ask price, or the ask price plus some minimum margin required by the platform 10. The rough diamond 62 for which the prices are being compared is a rough diamond 62 that meets all the purchaser's order requirements except the price. If the bid price is at or above the ask price, the sale can proceed by having the central system 34 communicate with the transaction settlement system 22 which received financial information for each party and tracks and settles transactions as they proceed. The central system 34 may output those diamonds 62 with the bid price at or above the ask price with an evaluation file for each, and the purchaser can review the evaluation files and select one or more of the evaluation files to let the sale go through. The central system 34 then transmits and stores a message indicating the sale of the rough diamond associated with the evaluation file. The message may be transmitted to the computer system at the repository 18 where the sold diamond 62 is stored and the purchaser's client computing device. In response, the sold diamond 62 is removed from the repository 18 and shipped to the purchaser. The sold diamond 62 may also be removed from the diamond inventory 36, but can also be stored (e.g., archived) for various purposes, such as for reporting, or to preserve certain aspects in the diamond blockchain 28.

The transaction settlement system 22, described above, can be used to complete the transactions mentioned in the various examples above. The transaction settlement system 22 links financial accounts of sellers and financial accounts of purchasers and provides for monetary exchange using bank withdrawals and bank deposits. The payment system may also be based on credit mechanisms such as withdrawing funds from and depositing funds into credit card account and debit card account. The financial information (e.g., bank and credit card information) may be pre-entered into the transaction settlement system 22 or provided to the transaction settlement system 22 when central system 34 determines that the sale should go through. With the available financial information from each party and the purchaser indicating its desire to proceed with the purchase, the transaction settlement system 22 examines the financial information received from the purchaser and check if the purchaser can make the payment of the sold diamond. The transaction settlement system 22 also examines the financial information received from the seller and check if the seller can receive the payment of the sold diamond. If both checks pass, the fund is withdrawn from and deposited into the corresponding account. If one of the checks fails, the transaction is denied. In this situation, the purchaser may be asked to provide an alternative payment method or the seller may be asked to provide an alternative receipt method. The examination and check steps may then be repeated until the transaction goes through. Each party is then notified and the seller removes the sold diamond 62 from the repository 18 and ships it to the purchaser. In some embodiments, with respect to each transaction for a rough diamond 62, if the bid price is higher than the ask price, the process directs the amount above the ask price to a financial account that is associated with the operation of the platform 10.

The platform 10 can be configured such that the central system 34, transaction settlement system 22, scanning system(s) 16 and repository 18 (in each case there can be multiple facilities for each that are distributed throughout the world) operate on a private network. A demilitarized zone ("DMZ") can be implemented that can include firewalls and web servers as a "front end" for private network. This can permit external devices (such as computers of purchasers or sellers) to communicate with the central system 34, for example, only through the DMZ. If desired, the third party PDP system 50 (if applicable) and PDP database 38 can be in the private network and would require access through the DMZ server or that system can be implemented as a stand-alone system.

In some embodiments, when a match is executed and settled, one or more messages are transmitted to the seller and the related repository 18. In response, the purchaser can collect the individual diamond 62 and other items that have been sold and delivered to a local office of the platform or to a third party. At the point of delivery, the diamonds 62 that have been delivered or reviewed for their identifier and potentially scanned in order to verify the correct diamonds 62 have been delivered. The receiving location can sort and aggregate received rough diamonds for transportation to the next distribution point.

Although FIGS. 1A-1D illustrate that the systems and devices are separated, some of these systems and devices may be built into one system or device. For example, the central system 34 may be configured to include the planning system 20, transaction settlement system 22, blockchain module 42, diamond inventory 36, PDP database 38 and/or third party PDP system 50.

Figure 11:
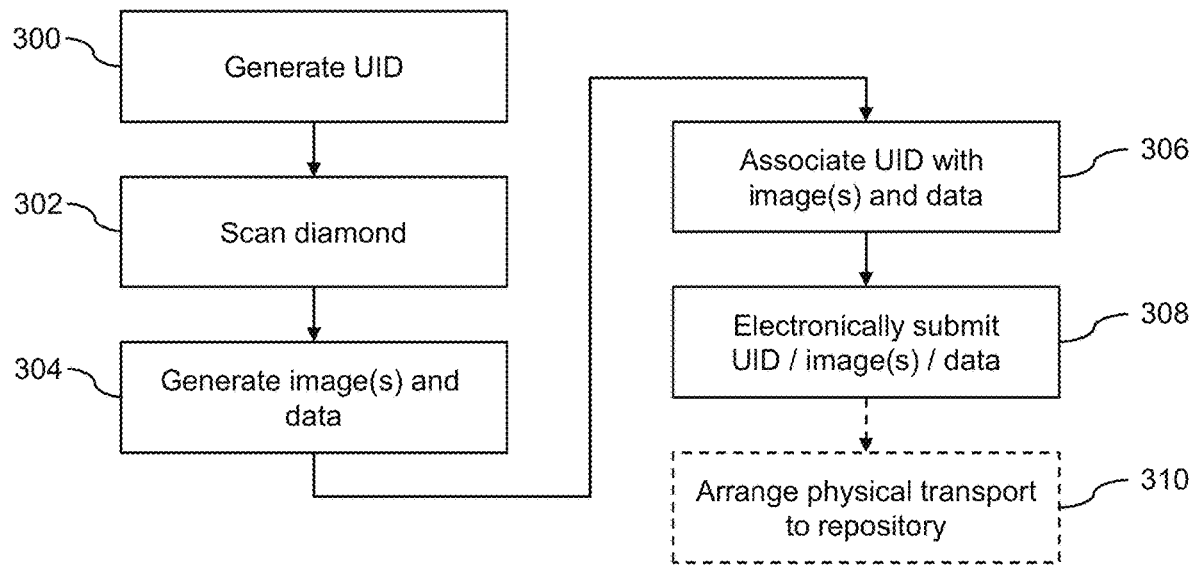
FIG. 11 is a block diagram illustrating operations performed in conducting a diamond scanning process.

FIG. 11 is a flow chart illustrating operations that can be performed by the platform 10 or seller in scanning a diamond 62 to be included in the platform 10. At step 300 the UID is generated. In this example, when a new record is created in the diamond inventory 36, the central system 34 generates a UID for that record. It can be appreciated that the seller can use the seller device 12 (or another device) to generate its own UID for that record. In this way, when the scan or image is uploaded to the platform 10 by the seller, that data would be added to a record and therefore have the UID created by the platform 10 and, if applicable, the seller's own UID. The seller then scans (or has scanned) the diamond 62 at step 302. The scanning operation generates the image(s) and associated data, including, for example, a 3D virtual model of the diamond 62 at step 304. The UID(s) may then be associated with the image(s) and data to create the diamond data file 56 at step 306, which can be transmitted electronically to the platform 10 via the network 14 and seller interface 30. As shown in dashed lines, when applicable, the physical transportation of the diamond 62 to the repository can be arranged at step 310.

Figure 12:
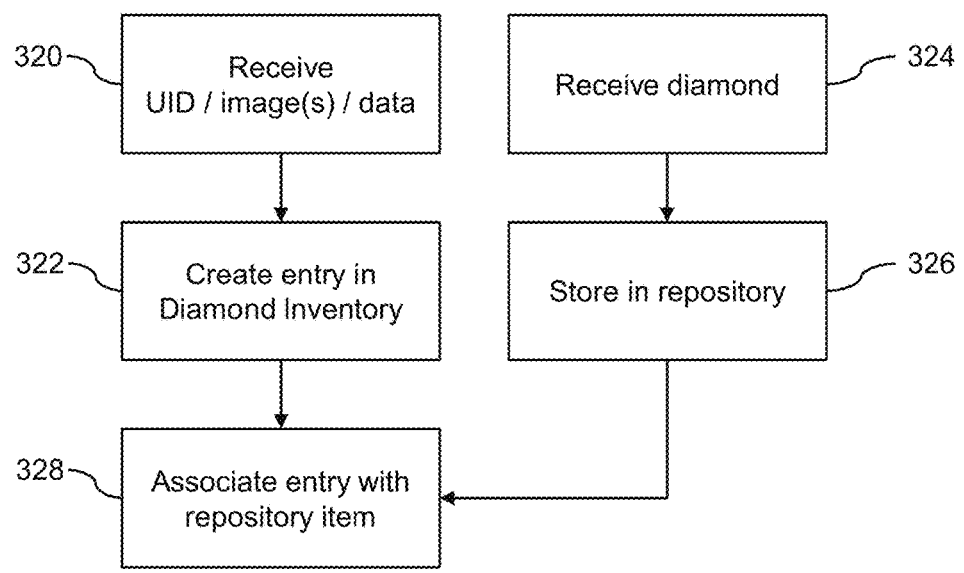
FIG. 12 is a block diagram illustrating operations performed in processing receipt of a new diamond to be registered with the electronic platform.

FIG. 12 is a flow chart illustrating operations that can be performed by the platform 10 in managing new inventory. At step 320 the platform 10 receives the data file 56 containing the UID(s)/IMG/Data and creates a new entry in the diamond inventory 36 at step 322. The platform 10 may also receive the physical diamond 62 at step 324 and store it in the repository at step 326. The entry in the diamond inventory 36 can then be associated with the repository item at step 328, e.g., by identifying the physical diamond 62 using the UID(s) or some other identifier.

Figure 13:
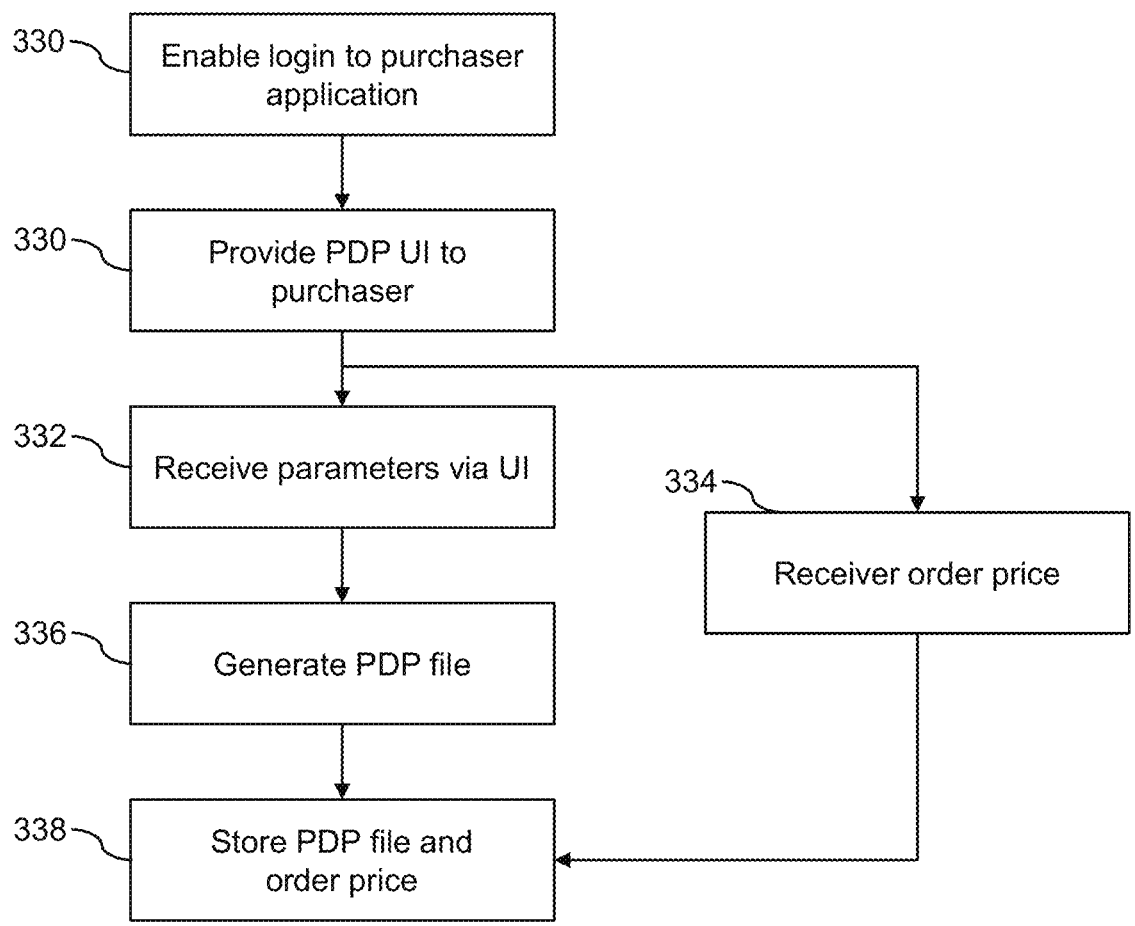
FIG. 13 is a block diagram illustrating operations performed in receiving a PDP and order price at the central system.

In FIG. 13, operations that can be performed by the PDP UI 40 or purchaser app 26 are shown, for creating and/or uploading a PDP 72 to the platform 10. At step 330 the purchaser application 26 enables the user to login to the system, which can include establishing a connection with the PDP UI 40. This enables the PDP UI screens (e.g. screens shown in FIGS. 5A-5F) to be provided to the purchaser at step 330. The purchaser application 26 then receives the specification, parameters, and tolerances at step 332 and the order price at step 334. The PDP 72 is generated at step 336 and can be stored with the order price at step 338. It can be appreciated that the order price may instead be stored as part the PDP 72, with an ability to override or change the order price for different orders.

Figure 14:
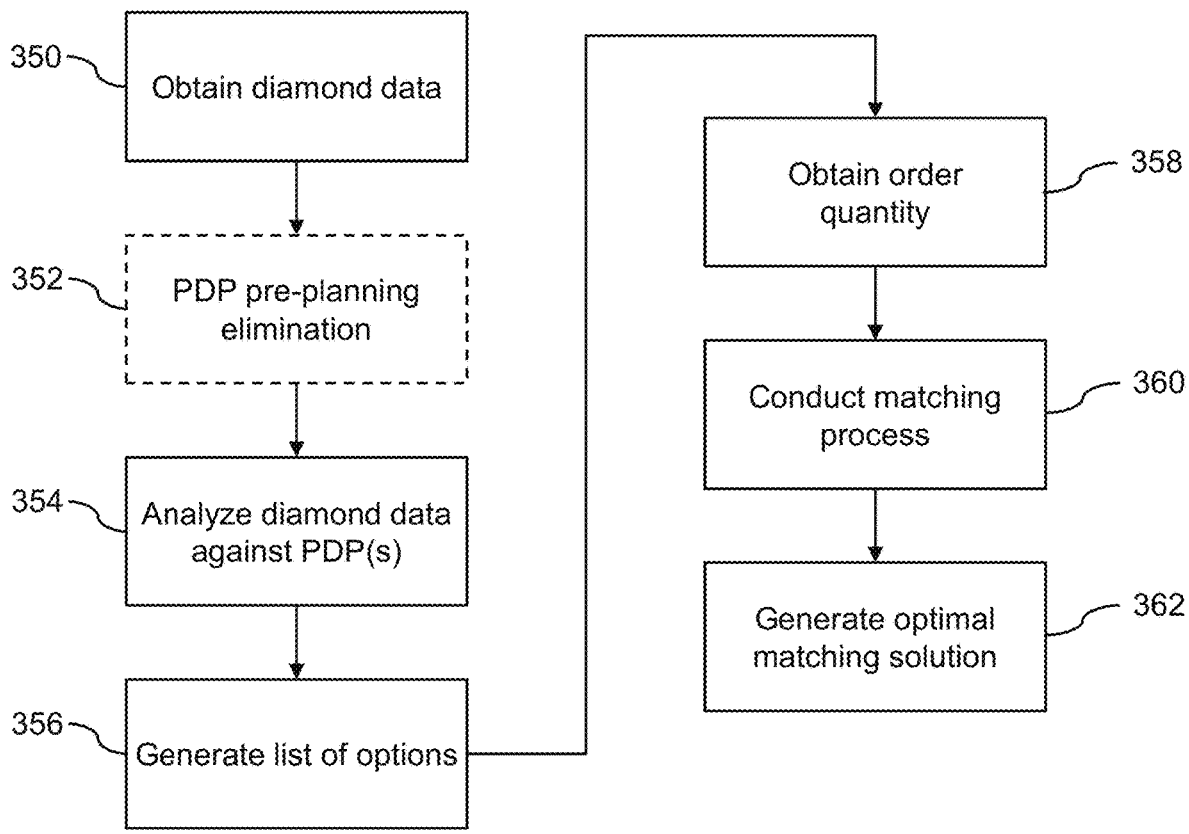
FIG. 14 is a block diagram illustrating operations performed in planning and matching diamonds to PDPs.

FIG. 14 illustrates operations that can be performed by the platform 10 in conducting the planning and matching processes. At step 350 the data file 56 for a diamond 62 is obtained and a PDP pre-planning elimination can optionally be performed at step 352, as illustrated schematically in FIG. 6, to reduce the number of PDPs 72 that are used in the planning process. At step 354 the planning system 20 analyzes the diamond data file 56 against the PDPs 72 and generates the list of options at step 356. The order quantity for the options are then obtained at step 358 to enable the matching process to be conducted at 360. This process results in the generation of an optimal matching solution at step 362.

Figure 15:
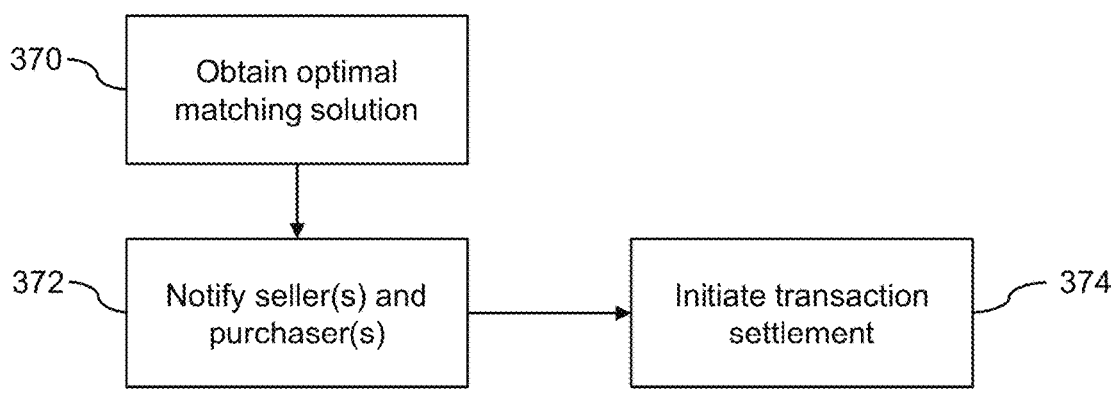
FIG. 15 is a block diagram illustrating operations performed in initiating a transaction settlement for one or more matched diamond orders.

As shown in FIG. 15, after obtaining the optimal matching solution at step 370 the platform 10 and transaction settlement system 22 can be used to notify the seller(s) and purchaser(s) of the matched orders at step 372, to thereafter initiate the transaction settlement(s) at step 374.

Along with, or parallel to the processes depicted in FIGS. 11-15, it can be appreciated that the blockchain module 42 can be used to create and/or update records in the diamond blockchain 28 to provide a secure and verifiable distributed ledger associated with a diamond 62, beginning at the rough diamond stage. In this way, not only can attributes and transaction events associated with the diamond be recorded, the blockchain 28 allows these attributes and events to be authenticated. The blockchain 28 will assemble the data in blocks that typically contain a cryptographic hash of the previous block, a timestamp, and transaction data. Since a given block cannot be altered retroactively without the alteration of all subsequent blocks, requiring collusion of the network majority, the diamond blockchain 28 coupled with the platform 10 provides the ability to establish verifiable records for diamonds that could not be created in traditional channels due to the need to retroactively verify the diamond before it would enter any similar set of records. It can be appreciated that the diamond blockchain 28 can be created and managed by an independent third party known to provide the infrastructure for such a blockchain.

Figure 16:
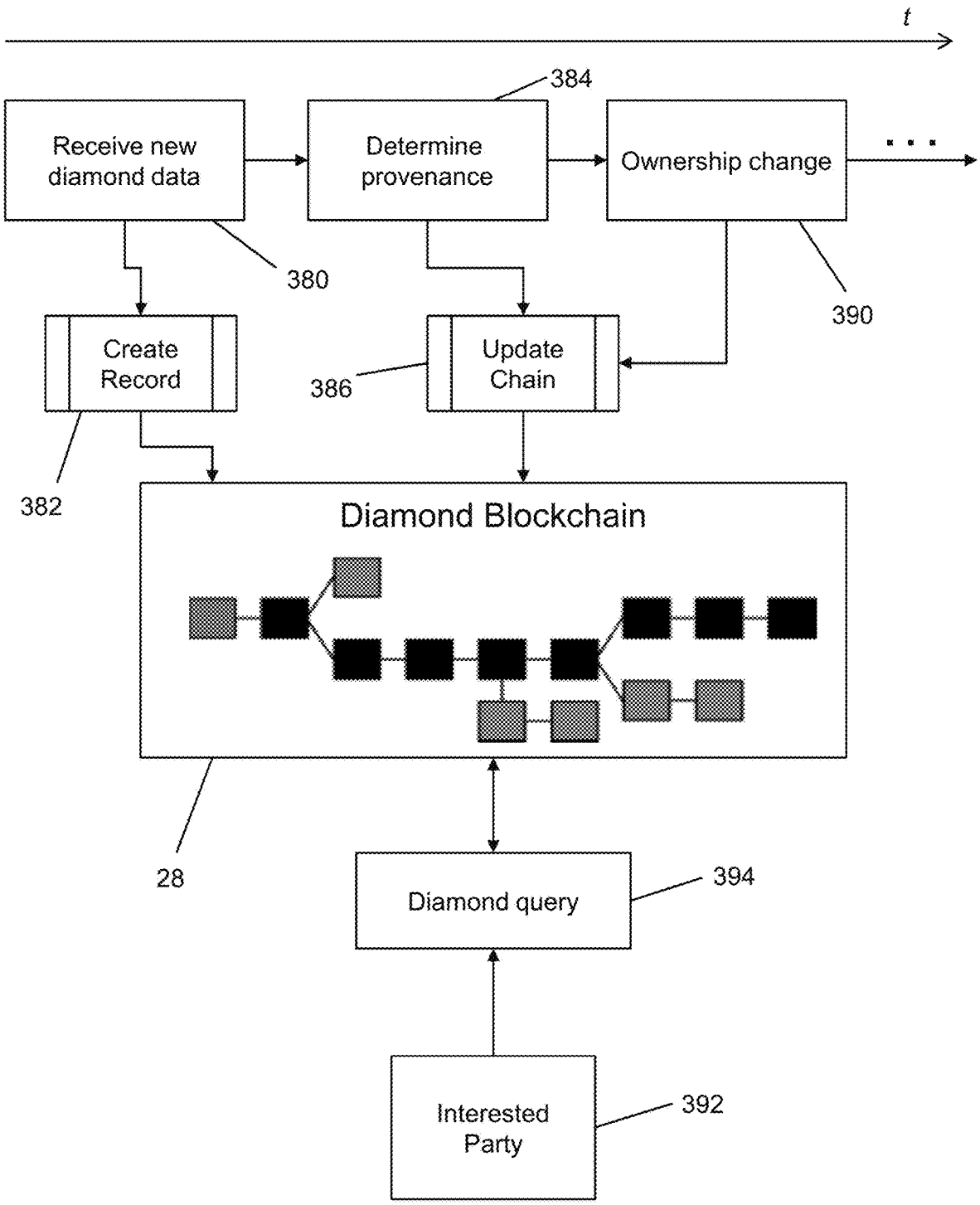
FIG. 16 is a schematic block diagram illustrating operations performed in creating and adding new diamond records to a diamond blockchain.

Turning now to FIG. 16, one configuration for interfacing between the platform 10 and the diamond blockchain 28 is shown. In this example, at step 380 wherein new diamond data (e.g. data file 56) is received by the platform 10, the platform 10 can initiate a create record process at 382 (e.g. using the blockchain module 42) to create a new record for a particular diamond 62 in the diamond blockchain 28. Later, other information may become known or discovered, such as the provenance of the diamond 62 at step 384. With this additional information, the platform 10 can execute an update chain process at 386 to add a record to the blockchain 28 that is linked to the previous record. This can occur at any desired point over time, for example an ownership change at step 390. The ownership change at step 390 can include various steps in the supply chain, a retail sale to a consumer, and subsequent sales of that diamond 62 by that or another consumer. By tracking and recording these events and information in the blockchain 28, queries can be made at 394, by an interested party 392, such as an appraiser, reseller, law enforcement or border control agency, etc.

The platform 10 also provides various other technical and economic advantages.

For instance, embodiments of the presently described platform 10 may allow purchasers to purchase rough diamonds individually that have the highest polished sales prices their unique manufacturing processes and polished sales distribution. Systems and methods discussed herein may also reduce liquidating efforts and the number of unnecessary products in the inventory because the purchaser can purchase only the diamonds it wants individually. Sellers may also achieve high profits by selling each diamond individually rather than having to group them into pre-established assortments. Such systems and methods may be utilized at any time, any frequency, and any location, without being limited to certain sales events hosted at certain locations. Embodiments of the platform 10 can also facilitate immediate, optimal, and accurate rough diamond transactions and connect the seller and buyer for a transaction that is beneficial to both parties.

A benefit of the platform 10 achieved by way of the technological configuration(s) described herein, is that the technological implementation creates advantages to both sellers and purchasers to thereby incentivize their participation and migration to the new system. A resulting incentive is that the sellers and purchasers can realize better financial results or higher margins. The average price at which diamonds are sold can increase due to the structure of the operation of the platform 10 and the purchasers will not necessarily need to engage a secondary market to sell rough diamonds 62 that are not suitable for the manufacturing process and/or distribution. For example, the above illustrative embodiments describe an online rough diamond trading platform 10 that stores proprietary manufacturing processes in secure locations and automatically applies the process information to virtual 3D models of rough diamonds to determine "matches" or whether the rough diamond is capable of a polished diamond according to the manufacturer process and as a result identifying a potential polished diamond (in virtual 3D state) that is associated that individual particular rough diamond (which has its own identifier for tracking). By interacting with a user interface of the platform, sellers can sell rough diamonds to purchasers as a result of electronic orders. The orders by purchasers can specify a range such as 1.0-2.5 Carat and other polished diamond specification when purchasing rough diamonds. The platform 10 can automatically fill the volume of diamonds ordered individually based on the available data and complex analysis, which can include volume and edge analysis. The interaction, results, in the rough diamonds 62 that meet the specific order parameters to be sorted and aggregated based on corresponding UI Ds and transported through a shipping process to the purchaser. Furthermore, an automated intelligent process can be implemented where the platform 10 sources the most suitable and competitively priced rough diamond to satisfy polished diamond orders. In the event of competing polished diamond orders (i.e., a rough diamond is suitable for more than one polished diamond order), the system can allocate the rough diamond toward the polished diamond order with the highest bid price.

One or more identifiers that is/are associated with a rough diamond 62 (e.g., UID, IMG, data) can be used to identify the rough diamond 62 (e.g., provide a unique address or fingerprint) for operational management in the platform 10.

It should be understood that if desired other types of sellers or other types of purchasers are contemplated even though the embodiments of the systems and methods are particularly suited for the initial introduction of new diamonds 62, particularly rough diamonds 62, into the distribution chain.

Software applications and data (such inventory information, polished diamond orders, transaction history, etc.) can be stored in non-transient or non-volatile memory for use in operation of the various features, as party of the overall platform 10 or as part of individual elements or as party shared resources (e.g., cloud resources).

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the platform 10, systems 16, 20, 22, blockchain 28, devices 12, 24, inventory 36, database 38, any component of or related thereto, or accessible or connectable thereto. This can include both local and cloud-based server and other computing devices. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method comprising:

receiving, via a first interface for sellers in a planning system, data in an imaging file generated from scans of the plurality of rough diamonds, wherein the data comprises a virtual model that digitally identifies each of the plurality of rough diamonds, a location of spatial and physical properties, an ask price of a seller and associated information for each of the plurality of rough diamonds;

generating, by the planning system, a record of each of the plurality of rough diamonds;

associating, by the planning system, a unique identifier with the record;

receiving, via a second interface for manufacturers in the planning system and in an escrow system, a plurality of orders from one or more of the manufacturers, each order of the plurality of orders comprising an offer price, a largest value differential between costs of each of the plurality of rough diamonds and a polished diamond, manufacturing processing parameters, customer parameters, the manufacturer's desired polished diamond parameters for a type of polishing and a method of polishing and impacts to the spatial and physical properties for each of the plurality of rough diamonds, and wherein the escrow system is not accessible to the plurality of manufacturers;

restricting, by the planning system, the manufacturing process parameters to only be viewable by a corresponding manufacturer;

evaluating, by the planning system, number, sizes, locations and quality of a manufacturer's desired polished diamonds within a virtual model;

applying, by the planning system, the data in the imaging file to a manufacturer's desired polished diamond parameters for each diamond cut to identify each of the plurality of rough diamonds with manufacturer's desired polished diamond parameters;

applying, by the planning system, the data in the imaging file to the manufacturer's desired polished diamond parameters for each diamond cut to identify the potential polished diamonds that can be produced from the plurality of rough diamonds that are unique to the manufacturer specifications, unique to polished diamond distribution and based on the manufacturer's desired polished diamond parameters;

applying, by the planning system, a type of manufacturing process for each of the plurality of rough diamonds based on the offer price, the largest value differential between the costs of each of the plurality of rough diamonds and the polished diamond, the manufacturing processing parameters, the customer parameters, the manufacturer's desired polished diamond parameters for the type of polishing and the method of polishing and the impacts to the spatial and physical properties for each of the plurality of rough diamonds;

selecting, by the planning system, a subset of the plurality of rough diamonds based on the applying;

implementing, by the planning system, a sale between the seller and the manufacturer for the subset of the plurality of rough diamonds, in response to the offer price of the manufacturer exceeding the ask price of the seller;

physically storing the subset of the plurality of rough diamonds in a repository; and associating, by the planning system, the subset of the plurality of rough diamonds in the repository with the data generated by the scan of the plurality of rough diamonds.

2. The method of claim 1, wherein the scan is accomplished by:

scanning, by the planning system using an imaging system, an interior of the rough diamond and an exterior of the rough diamond;

creating, by the planning system, a 3D model showing a location of inclusions for the rough diamond based on the interior of the rough diamond and the exterior of rough the rough diamond;

generating, by the planning system, an imaging file for the rough diamond containing the 3D model, the location of the inclusions and associated information for the rough diamond.

3. The method of claim 1, further comprising aggregating, by the planning system, the rough diamonds sold to the same manufacturer.

4. The method of claim 1, further comprising filtering the plurality of orders to eliminate orders with irrelevant polished diamond parameters to reduce a size of a planning job.

5. The method of claim 1, further comprising storing the polished diamond parameters in a secure storage logically separate from the records associated with the rough diamond inventory.

6. The method of claim 5, wherein the secure storage is operated by a third party system via a fourth interface with the planning platform.

7. The method of claim 1, further comprising receiving a plurality of data files, each data file being associated with a different rough diamond.

8. The method of claim 1, further comprising generating a user interface screen comprising a rough diamond plan for the individual diamond; and providing the user interface screen to the manufacturer.

9. The method of claim 1, further comprising checking, by the planning system, identifiers of the rough diamonds at different points in a distribution chain to confirm secure transfer to the manufacturer.

10. The method of claim 1, further comprising creating a new blockchain record for the rough diamond, and having the new blockchain record added to a rough diamond blockchain.

11. The method of claim 10, further comprising creating at least one additional record for the rough diamond that is linked to the new blockchain record at a later point in time.

12. A method comprising:

receiving, via a first interface for sellers in the planning system, data in an imaging file generated from a scan of a rough diamond, wherein the data comprises a virtual model that digitally identifies the rough diamond, a location of spatial and physical properties, an ask price of a seller and associated information for each rough diamond;

generating, by the planning system, a record of the rough diamond and associating a unique identifier with the record;

receiving, via a second interface for a plurality of manufacturers in the planning system and in an escrow system, input from the plurality of manufacturers about a plurality of raw diamonds, prior to the plurality of manufacturers seeing the plurality of raw diamonds, wherein the input includes polished diamond parameters for the plurality of raw diamonds comprising shapes for subsets of the plurality of polished diamonds, angles of subsets of the plurality of polished diamonds, cuts of subsets of the plurality of polished diamonds, desired sales prices for each of the plurality of polished diamonds, quantity of each of the plurality of raw diamonds to be sold at the desired sales price, acceptable diamond mines of origin for the plurality of raw diamonds, costs, profile for each of the plurality of polished diamonds, color for each of the plurality of polished diamonds, maximum number of the plurality of raw diamonds for purchase, and losses due to a cutting style used in the manufacturing process parameters; and wherein the escrow system is not accessible to the plurality of manufacturers;

restricting, by the planning system, the manufacturing process parameters to only be viewable by a corresponding manufacturer;

processing, by the planning system, the input from the plurality of manufacturers and with the plurality of polished diamonds;

developing, by the planning system, a manufacturing processing plan for each of the plurality of raw diamonds based on the input from the plurality of manufacturers;

determining, by the planning system, a maximum value of each of the plurality of raw diamonds based on the manufacturing processing plan;

assigning, by the planning system, each of the plurality of raw diamonds to one or more of the plurality of manufacturers based on the quantity of each of the plurality of raw diamonds at the desired sales price by the one or more of the plurality of manufacturers;

notifying, by the planning system, the one or more of the plurality of manufacturers about a subset of the plurality of raw diamonds assigned to each of the one or more of the plurality of manufacturers;

physically storing the subset of the plurality of rough diamonds in a repository; and associating, by the planning system, the subset of the plurality of rough diamonds in the repository with the data generated by the scan of the plurality of rough diamonds.

13. The method of claim 12, wherein:

the desired sales prices for each of the plurality of polished diamonds are associated with a desired size, color, clarity and fluorescence;

the costs are for certification and labor; and the color for each of the plurality of polished diamonds includes color probability.

14. A system comprising:

a processor in communication with a planning system; and a tangible, non-transitory memory configured to communicate with the processor, the tangible, non-transitory memory having instructions stored thereon that, in response to execution by the processor, cause the processor to perform operations comprising:

receiving, via a first interface for sellers in the planning system, data in an imaging file generated from a scan of a rough diamond, wherein the data comprises a virtual model that digitally identifies the rough diamond, a location of spatial and physical properties, an ask price of a seller and associated information for each rough diamond;

generating, by the planning system, a record of the rough diamond and associating a unique identifier with the record;

receiving, via a second interface for manufacturers in the planning system and in an escrow system, a plurality of orders from one or more of the manufacturers, each order of the plurality of the orders comprising an offer price, a largest value differential between costs of the rough diamond and a polished diamond, manufacturing processing parameters, customer parameters, the manufacturer's desired polished diamond parameters for a type of polishing and a method of polishing and impacts to the spatial and physical properties for each rough diamond, and wherein the escrow system is not accessible to the plurality of manufacturers;

restricting, by the planning system, the manufacturing process parameters to only be viewable by the corresponding manufacturers;

evaluating, by the planning system, number, sizes, locations and quality of a manufacturer's desired polished diamonds within a virtual model;

applying, by the planning system, the data in the imaging file to a manufacturer's desired polished diamond parameters for each diamond cut to identify the rough diamonds with manufacturer's desired polished diamond parameters;

applying, by the planning system, the data in the imaging file to the manufacturer's desired polished diamond parameters for each diamond cut to identify the potential polished diamonds that can be produced from the rough diamonds that are unique to the manufacturer specifications, unique to polished diamond distribution and based on the manufacturer's desired polished diamond parameters;

applying, by the planning system, a type of manufacturing process for each rough diamond based on the offer price, the largest value differential between the costs of the rough diamond and the polished diamond, the manufacturing processing parameters, the customer parameters, the manufacturer's desired polished diamond parameters for the type of polishing and the method of polishing and the impacts to the spatial and physical properties for each rough diamond;

selecting, by the planning system, a subset of the plurality of rough diamonds based on the applying;

implementing, by the planning system, a sale between the seller and the manufacturer for the subset of the plurality of rough diamonds, in response to the offer price of the manufacturer exceeding the ask price of the seller;

physically storing the subset of the plurality of rough diamonds in a repository; and associating, by the planning system, the subset of the plurality of rough diamonds in the repository with the data generated by the scan of the plurality of rough diamonds.

15. The system of claim 14, wherein the planning system is operated by a third party via a third interface with an electronic platform.

16. The system of claim 14, further comprising filtering the plurality of orders to eliminate orders with irrelevant polished diamond parameters to reduce a size of a planning job.

17. The system of claim 14, further comprising storing the polished diamond parameters in a secure storage logically separate from the records associated with the rough diamond inventory.

18. The system of claim 17, wherein the secure storage is operated by a third party system via a fourth interface with the planning platform.

19. The system of claim 14, further comprising receiving a plurality of data files, each data file being associated with a different rough diamond.

20. The system of claim 14, further comprising:
generating a user interface screen comprising a rough diamond plan for the rough diamond; and
providing the user interface screen to the manufacturer.

21. The system of claim 14, further comprising providing one or more screens for entering the polished diamond parameters via the second user interface.

22. The system of claim 14, further comprising creating a new blockchain record for the rough diamond, and having the new blockchain record added to a rough diamond blockchain.

23. The system of claim 22, further comprising creating at least one additional record for the rough diamond that is linked to the new blockchain record at a later point in time.

\* \* \* \* \*

UNITED STATES PATENT AND TRADEMARK OFFICE
CERTIFICATE OF CORRECTION

| | |
|---|---|
| PATENT NO. | : 11,776,033 B2 |
| APPLICATION NO. | : 15/975692 |
| DATED | : October 3, 2023 |
| INVENTOR(S) | : Aaron Ariel et al. |

It is certified that error appears in the above-identified patent and that said Letters Patent is hereby corrected as shown below:

In the Claims

Column 26, Claim 2, Line 32, please delete the first instance of the word "rough"

Signed and Sealed this
Twenty-first Day of November, 2023

*Katherine Kelly Vidal*

Katherine Kelly Vidal
*Director of the United States Patent and Trademark Office*